United States Patent
Kuznetsov

(10) Patent No.: US 9,441,984 B2
(45) Date of Patent: Sep. 13, 2016

(54) METHOD AND SYSTEM FOR TRANSMITTING AND/OR RECEIVING AT LEAST ONE LOCATION REFERENCE, ENHANCED BY AT LEAST ONE FOCUSING FACTOR

(75) Inventor: Tsia Kuznetsov, Cupertino, CA (US)

(73) Assignee: TomTom North America, Inc., Lebanon, NH (US)

( * ) Notice: Subject to any disclaimer, the term of this patent is extended or adjusted under 35 U.S.C. 154(b) by 308 days.

(21) Appl. No.: 13/127,715

(22) PCT Filed: Dec. 30, 2008

(86) PCT No.: PCT/US2008/014104
§ 371 (c)(1),
(2), (4) Date: Jul. 6, 2011

(87) PCT Pub. No.: WO2010/077225
PCT Pub. Date: Jul. 8, 2010

(65) Prior Publication Data
US 2011/0257883 A1    Oct. 20, 2011

(51) Int. Cl.
*G01C 21/30* (2006.01)
*G01C 21/36* (2006.01)
*G08G 1/0969* (2006.01)
(Continued)

(52) U.S. Cl.
CPC ........... *G01C 21/3691* (2013.01); *G01C 21/32* (2013.01); *G08G 1/0969* (2013.01); *G09B 5/125* (2013.01)

(58) Field of Classification Search
CPC ................. G08G 1/096811; G08G 1/096716; G08G 1/096827; G08G 1/096844; G08G 1/096775; G08G 1/096866; G08G 1/0969; G08G 1/096741

USPC ......... 701/117, 118, 119, 409, 420, 445, 533
See application file for complete search history.

(56) References Cited

U.S. PATENT DOCUMENTS 6,199,045 B1 * 3/2001 Giniger et al. ................ 705/1.1
6,253,146 B1 * 6/2001 Hanson et al. ............... 701/414
6,298,303 B1 * 10/2001 Khavakh et al. ............. 701/533
(Continued)

FOREIGN PATENT DOCUMENTS

DE    10 2005 041123    3/2007
EP        1 273 883      1/2003
(Continued)

OTHER PUBLICATIONS

International Preliminary Report on Patentability and Written Opinion of the International Search Authority issued on Jul. 5, 2011 for International Application No. PCT/US2008/014101.
(Continued)

*Primary Examiner* — Truc M Do

(57) ABSTRACT

A method and end user mapping device (200) are disclosed. In at least one embodiment, the method includes receiving information from a remote server (302), at a device, the received information including at least one location reference enhanced by at least one focusing factor, computed at the remote server (302) based upon encoded information corresponding to at least one path of the at least one location reference; and reconstructing the at least one path of the at least one location reference at the device, based upon the received at least one location reference enhanced by the at least one focusing factor.

26 Claims, 11 Drawing Sheets

(51) Int. Cl.
*G09B 5/12* (2006.01)
*G01C 21/32* (2006.01)

(56) References Cited

U.S. PATENT DOCUMENTS

| | | | |
|---|---|---|---|
| 6,314,365 B1* | 11/2001 | Smith | 701/433 |
| 6,490,521 B2* | 12/2002 | Wiener | 701/443 |
| 6,496,776 B1* | 12/2002 | Blumberg et al. | 701/516 |
| 7,269,505 B2* | 9/2007 | Zhao et al. | 701/423 |
| 7,353,108 B2* | 4/2008 | Adachi | 701/410 |
| 8,151,314 B2 | 4/2012 | McCarthy et al. | |
| 8,335,647 B2* | 12/2012 | Kurtti et al. | 701/533 |
| 8,355,870 B2 | 1/2013 | Link et al. | |
| 8,463,543 B2 | 6/2013 | Waldman et al. | |
| 8,938,355 B2 | 1/2015 | Das et al. | |
| 9,043,148 B2 | 5/2015 | Bourque et al. | |
| 2002/0034292 A1* | 3/2002 | Tuoriniemi et al. | 379/219 |
| 2002/0128768 A1* | 9/2002 | Nakano et al. | 701/202 |
| 2002/0152020 A1* | 10/2002 | Seibel | 701/208 |
| 2003/0023371 A1* | 1/2003 | Stephens | 701/209 |
| 2003/0033176 A1* | 2/2003 | Hancock | 705/6 |
| 2003/0036842 A1* | 2/2003 | Hancock | 701/200 |
| 2004/0039523 A1* | 2/2004 | Kainuma et al. | 701/208 |
| 2004/0220729 A1* | 11/2004 | Park et al. | 701/209 |
| 2005/0055160 A1* | 3/2005 | King | 701/213 |
| 2005/0288046 A1* | 12/2005 | Zhao et al. | 455/466 |
| 2006/0129691 A1* | 6/2006 | Coffee et al. | 709/230 |
| 2006/0184322 A1* | 8/2006 | Kim | 701/211 |
| 2006/0247848 A1 | 11/2006 | Cheng | |
| 2007/0103671 A1* | 5/2007 | Ash | 356/139.01 |
| 2007/0143017 A1* | 6/2007 | Reich | 701/213 |
| 2007/0156329 A1 | 7/2007 | Komatsu | |
| 2008/0045234 A1* | 2/2008 | Reed | 455/456.1 |
| 2008/0046176 A1* | 2/2008 | Jurgens | 701/210 |
| 2008/0046369 A1* | 2/2008 | Wood | 705/50 |
| 2008/0103691 A1* | 5/2008 | Chen et al. | 701/207 |
| 2008/0167798 A1 | 7/2008 | Tertoolen | |
| 2008/0228393 A1* | 9/2008 | Geelen et al. | 701/208 |
| 2008/0243378 A1* | 10/2008 | Zavoli | 701/209 |
| 2008/0244091 A1* | 10/2008 | Moore et al. | 709/246 |
| 2009/0024316 A1 | 1/2009 | Sutanto | |
| 2009/0024318 A1* | 1/2009 | Sakai | 701/209 |
| 2009/0125229 A1* | 5/2009 | Peri et al. | 701/201 |
| 2009/0144268 A1* | 6/2009 | Nagase | 707/5 |
| 2009/0222200 A1 | 9/2009 | Link et al. | |
| 2009/0287408 A1* | 11/2009 | Gerdes et al. | 701/202 |
| 2009/0328116 A1 | 12/2009 | McCarthy et al. | |
| 2010/0042651 A1* | 2/2010 | Nakamura et al. | 707/104.1 |
| 2010/0145608 A1* | 6/2010 | Kurtti et al. | 701/202 |
| 2010/0168996 A1* | 7/2010 | Bourque et al. | 701/200 |
| 2010/0235091 A1* | 9/2010 | Das et al. | 701/208 |
| 2011/0113155 A1* | 5/2011 | Kuznetsov et al. | 709/241 |
| 2011/0196610 A1* | 8/2011 | Waldman et al. | 701/209 |
| 2011/0257883 A1* | 10/2011 | Kuznetsov | 701/209 |
| 2011/0257973 A1* | 10/2011 | Chutorash et al. | 704/235 |
| 2012/0022781 A1* | 1/2012 | Wilson | 701/410 |

FOREIGN PATENT DOCUMENTS

| | | | | |
|---|---|---|---|---|
| EP | 1 788 495 | | 5/2007 | |
| WO | 2007140527 | | 12/2007 | |
| WO | WO 2007140527 A1 * | 12/2007 | | G01C 21/32 |
| WO | 2008019344 | | 2/2008 | |

OTHER PUBLICATIONS

International Search Report issued on Sep. 23, 2009 for International Application No. PCT/US2008/014101.
International Preliminary Report on Patentability and Written Opinion of the International Search Authority issued on Jul. 5, 2011 for International Application No. PCT/US2008/014104.
International Search Report issued on Sep. 7, 2010 for International Application No. PCT/US2008/014104.
XP 009135554 Wartenberg et al: "Algorithms for Location Referencing" Jahresbericht Der Deutschen Mathematiker Vereinigung vol. 108, No. 1 Jan. 1, 2006.
XP 011184157 Schneebauer C et al: "On-The-Fly Location Referencing Methods for Establishing Traffic Information Services" IEEE Aerospace and Electronic Systems Magazine, IEEE Service Center, Piscataway, NJ, US vol. 22 No. 2 Feb. 4, 2007.
PCT/US2008/014104, ISR (International Search Report) dated Jul. 2, 2010.

* cited by examiner

METHOD AND SYSTEM FOR TRANSMITTING AND/OR RECEIVING AT LEAST ONE LOCATION REFERENCE, ENHANCED BY AT LEAST ONE FOCUSING FACTOR

This application is the National Stage of International Application No. PCT/US2008/014104, filed Dec. 30, 2008 and designating the United States. The entire content of this application is incorporated herein by reference.

FIELD

Embodiments of the present invention generally relate to methods and/or systems for transmitting information, for use in navigation for example, and/or method and systems for receiving and processing the transmitted information.

BACKGROUND

In recent years, consumers have been provided with a variety of devices and systems to enable them to locate places or destinations on a digital map. The terms "places" or "destinations" are general terms used throughout the description of embodiments of this invention. The term "places" or "destinations" includes street addresses, buildings located at street addresses such as businesses and landmarks, and facilities located at a number of street addresses such as shopping malls and business parks. The variety of devices and systems used by consumers or "users" are in the form of in-vehicle navigation systems that enable drivers to navigate over streets and roads; hand-held devices such as personal digital assistants ("PDAs"), personal navigation devices (PNDs), and cell phones or other types of mobile devices that can perform navigation or utilize digital map data; desktop applications, and Internet applications in which users can generate maps showing desired places and use other mapping services, etc., collectively referenced herein as "end user mapping devices". These end user mapping devices may be personal or commercial. The common aspect in all of these and other types of end user mapping devices is a map database of geographic features, vectors and attributes, and software to access, and/or manipulate, and/or navigate the map database in response to user inputs.

Essentially, in all of these end user mapping devices, a user can enter a desired place or destination and the returned result will be the location of that place or destination. Typically, users will enter the name of a business, such as a restaurant for example, or a destination landmark, such as the Golden Gate Bridge for example, or a street address, etc. The device/system then determines and returns the location of the requested place. The location may be shown on a map display, or may be used to calculate and display driving directions to the location in a known manner, or used in other ways.

As technology progresses, it becomes more and more important for a system to allow someone with the spatial content information or mapping information to communicate locations of dynamic content (known as a location reference, wherein a location reference can include one or more paths, and wherein non-limiting examples of a location reference include a traffic message such as a traffic jam, road closures, etc., a TMC location, a detour, a suggested tourist route, etc.), within the mapping information to travelers (via broadcasting packets of information to end user mapping devices including but not limited to in-vehicle and portable navigation devices (PNDs)) to enable routing between a location of a user and a desired destination of a user to occur in an improved, if not optimal, manner. For example, if a user of some type of navigation device or device with navigation capabilities, for example, can obtain a location of a location reference within mapping information indicating that there is a traffic jam along a stretch of highway that the user would be traveling on based upon his current route of travel, it would be desirable for the user of the navigation device to receive this information so that an improved route of travel could be calculated to avoid the traffic jam, for example.

Some methods broadcasting locations of such dynamic content or location references such as traffic jams, road closures, etc. is generally known (via broadcasting information packets to multiple remotely located end user mapping devices), as is re-routing of travel routes from obtained traffic information. The location on an encoding mapping device must be described in such a way that others receiving the information on a decoding device can understand the location of the traffic jam, road closure, etc. within stored spatial content or mapping information. However, the "location" may be mis-translated depending on a type or even version of map information that a decoding mapping device might be using (noting that the term "location reference" within the spatial content information may be more than just a point, namely it may be one or more paths or areas or anything that is a spatial description). Further, if too much information is conveyed, the speed of the location calculation at the end user mapping device may undesirably slow down.

Regarding the determination and conveying of a location reference, conveying of the information has been contemplated utilizing, for example, international codes for locations on stored maps for mapping applications. It is a current practice that a government agency or an industry consortium has authority to code the identity of each important spatial location such as a Traffic Message Channel code (TMC). However, such an authority has to maintain the codes, and the vendors of each of the databases or mapping application vendors have to incorporate these codes for subsequent application in all devices utilizing mapping applications. Such processes naturally limit the extent and currency of agreed upon location codes, which cover only a tiny fraction of map locations. Further, as the traffic reporting industry and mapping applications mature, the industry demands flexibility to reference a random location just in time, without pre-assigned codes, for dereferencing by mapping applications on map data from different map data suppliers or different data versions of the same supplier.

Thereafter, the mapping industry attempted to standardize what would be enough information, regarding location references (noting that a location reference may include one or more paths, and/or a traffic message such as a traffic jam or road closure location, a TMC location, a detour, a suggested tourist route, etc., which are all non-limiting examples of a location reference), to adequately convey a location within map information for example. Dynamic location referencing methods are designed so that irrespective of whose map or what map version is being used, enough information would be included to accurately reconstruct the referenced location within stored map information used in the decoding mapping device, such as a navigation device for example.

Typically, dynamic location reference methods go beyond just latitude and longitude of a traffic jam or road closure location, but also supply street and cross street names and other location properties. Modern map data is typically of good quality, being based on large scale area or satellite images and highly accurate field data collection, especially for high-usage locations. Yet there are still enough differences between data models, geometry and attributes and map data from different vendors and different versions of maps to make reliable road location referencing a non-trivial problem. Originating and decoding map data could be different in significant details between map data versions of the same vendor, and especially between two different vendors. The quality of dynamic location referencing methods is measured by location match rate between encoding and decoding devices. To reach an acceptable rate, some methods increase the amount of information provided regarding the location, which causes increased location encoding footprint, and requires inordinate encoding and decoding time. Thus, as the information content or location footprint become too large, decoding becomes a problem, especially in smaller end-user mapping devices which may not have significant processing power (such as portable navigation devices, for example).

Recently a method called Agora-C was developed as a location referencing standard aimed to meet a 95% decoding success rate on maps of different origins or of different versions, considered acceptable by the industry. However, the method is enormously complex, encoding is computationally intensive, and a location encoding footprint is relatively large, which may cause poor performance of the decoding process on small end user mapping devices.

Location referencing methods often utilize functional road class (FRC) as part of the encoding process, wherein roads are classified such as highways, small streets, etc. based on map data attributes. An FRC depicts the functional importance of a road, and is among the most common characteristic of linear feature encodings accepted by a variety of location referencing methods. Many location reference methods (including Agora-C) require computation of shortest paths in the process of encoding and decoding a location reference. In such methods, the shortest path computation which takes place in both an encoder of information and a decoder of information, is driven by a cost of travel along the link, wherein the more important the road, the cheaper the cost of travel per unit of distance.

Functional road class (FRC) is often used in route calculation of modern dynamic location reference methods (wherein Agora-C defines 10 FRCs, from low residential to the highest speed motorway, which are derived from map data). However, FRC attributes in map data are often results of a judgment call of a digital cartographer or field data collector, wherein mapmakers have no firm standard or agreements on FRCs. FRC values could be assigned based on a country's administrative road network scheme, speed limit, road vanity, reasons for providing a more beautified map display, or mixture of some or all of the reasons previously mentioned. Internal guidelines are subject to interpretation. Apart from topmost motorways or clearly residential streets, FRCs are therefore too vague to be considered reliably matched between versions of the database let alone, from one vendor's map database to another vendor's map database.

Accordingly, FRCs are often a likely culprit in location dereferencing errors, noting that differences in cost induced by ambiguous FRC mapping between different maps may cause significant difference in path computation by a decoding device, such as an end user mapping device 200 for example. Furthermore, introduction of massive amounts of probe data utilized for map data updating will subject mid-tier FRCs to a high rate of change, causing location referencing match rates to degrade even on data from different releases of the map databases from the same vendor.

An encoded location reference usually includes one or more paths, each including starting and ending points, and typically along with routing points or their equivalents, spatial markers, to help disambiguate a location on an encoding device, wherein routing points are placed along location reference paths such that connecting segments between each consecutive pairs of routing points coincide with the shortest path between them. A remote decoding device such as an end user mapping device, for example, identifies candidates for routing points and computes shortest paths between them to reconstruct an encoded location. While fast decoding speed is critical, a path reconstruction process on a decoding device often performs unnecessary work, exploring all potential routing nodes in a large area.

SUMMARY

At least one embodiment of the present application is directed toward encoding and decoding of linear location references when a path needs to be computed twice: first as part of a location encoding process, and then as part of path reconstruction step in location reference decoding process.

At least one embodiment of the present application is directed toward conveying location reference information in a more universally useable manner and/or conveying location reference information in a manner which improves the decoding process at the remote device.

At least one other embodiment of the present application is directed to a method comprising at least one of obtaining and receiving information regarding at least one location reference at a server for transmission to at least one remote device; determining at least one path of the at least one location reference corresponding to at least one pair of points within mapping information at the server; computing at least one focusing factor at the server based upon encoded information corresponding to the determined at least one path of the at least one location reference, and enhancing the at least one location reference by the computed at least one focusing factor; and transmitting the at least one location reference enhanced by the computed at least one focusing factor from the server to the at least one remote device.

At least one other embodiment of the present application is directed to a computer readable medium including program segments for, when executed on a processor of the server, causing the server to implement the method.

At least one embodiment of the present application is directed to a method comprising receiving information from a remote server, at a device, the received information including at least one location reference enhanced by at least one focusing factor, computed at the remote server based upon encoded information corresponding to at least one path of the at least one location reference; and reconstructing the at least one path of the at least one location reference at the device, based upon the received at least one location reference enhanced by the at least one focusing factor.

At least one other embodiment of the present application is directed to a computer readable medium including program segments for, when executed on a processor of the server, causing the server to implement any of the methods.

At least one other embodiment of the present application is directed to a system comprising a receiver to at least one of obtain and receive information regarding at least one location reference at a server for transmission to at least one remote device; a processor to determine at least one path of the at least one location reference corresponding to at least one pair of points within mapping information at the server and to compute at least one focusing factor at the server based upon encoded information corresponding to the determined at least one path of the at least one location reference; and a transmitter to transmit the at least one location reference enhanced by the at least one computed focusing factor from the server to the at least one remote device.

At least one other embodiment of the present application is directed to a device comprising a receiver to receive information from a remotely located server, the information including at least one location reference enhanced by at least one focusing factor computed at the server based upon encoded information corresponding to at least one path of the at least one location reference; and a processor to reconstruct the at least one path of the at least one location reference at the device, based upon the computed at least one location reference enhanced by at least one focusing factor.

Advantages of these embodiments are set out hereafter, and further details and features of each of these embodiments are defined in the accompanying dependent claims and elsewhere in the following detailed description.

BRIEF DESCRIPTION OF THE DRAWINGS

Various aspects of the teachings of embodiments of the present invention, and arrangements embodying those teachings, will hereafter be described by way of illustrative example with reference to the accompanying drawings, in which.

DETAILED DESCRIPTION OF EXAMPLE EMBODIMENTS

Figure 1:
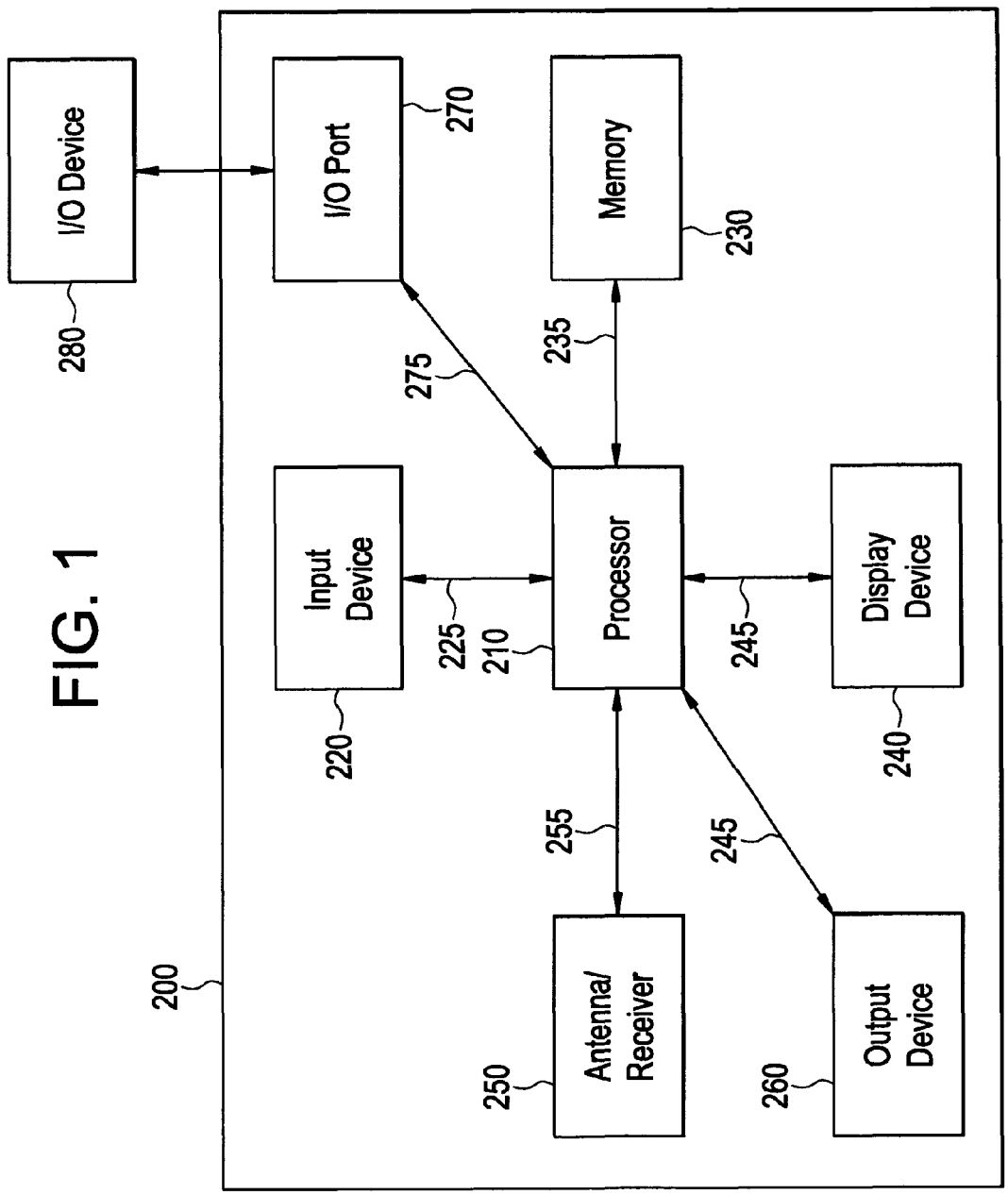
FIG. 1 illustrates electronic components arranged to provide a navigation device of an example embodiment of the present application.

Example embodiments of the present invention will now be described with particular reference to end user mapping devices, including but not limited to a personal navigation device (PND). It should be remembered, however, that the teachings of the present invention are not limited to PNDs or even other navigation devices, but are instead universally applicable to any type of mapping devices including but not limited to processing devices that are configured to execute mapping software so as to provide route planning and/or navigation and/or other types of mapping services. These include but are not limited to hand-held devices such as personal digital assistants ("PDAs"), personal navigation devices (PNDs), and cell phones or other types of mobile devices that can perform mapping services; desktop applications, and Internet applications in which users can generate maps showing desired places, etc., collectively referenced herein as "end user mapping devices".

Note that servers that typically encode location references may, in some use case scenarios, also be recipients of location reference messages for the purpose of decoding, and thus can be an "end user mapping device" which receives an enhanced location reference for path reconstruction. Conversely, any end user mapping device such as a PND or a mobile phone may in some use cases encode a location for transmission to other end user devices and thus may be considered a device which transmits an enhanced location reference. Thus, henceforth in this application any location reference encoding device may be called a server, and visa versa, any decoding device can be called end user mapping device.

Communication between such devices can be one-to-one or one-to-many, depending on the use case. Thus, the server can broadcast transmitted information to a plurality of end user mapping devices.

The common aspect in all of these and other types of end user mapping devices is a map database of geographic features, vectors and attributes, and software to access, manipulate and navigate the map database in response to user inputs. It follows therefore that in the context of the present application, a navigation device is intended to include (without limitation) any type of route planning and navigation device, irrespective of whether that device is embodied as a PND, a navigation device built into a vehicle, or indeed a computing resource (such as a desktop or portable personal computer (PC), mobile telephone or portable digital assistant (PDA)) executing route planning and navigation software, and an end user mapping device is intended to include, but is not limited to any type navigation device or other useable mapping devices.

It will also be apparent from the following that the teachings of embodiments of the present invention even have utility in circumstances where a user is not seeking instructions on how to navigate from one point to another, but merely wishes to be provided with a view of a given location. In such circumstances the "destination" location selected by the user need not have a corresponding start location from which the user wishes to start navigating, and as a consequence references herein to the "destination" location or indeed to a "destination" view should not be interpreted to mean that the generation of a route is essential, that traveling to the "destination" must occur, or indeed that the presence of a destination requires the designation of a corresponding start location.

As shown in FIG. 1, at least one embodiment of the present application may be directed to an end user mapping device 200, comprising a receiver 250 to receive information from a remotely located server 302, the information including at least one location reference enhanced by at least one focusing factor, computed at the server 302 based upon encoded information corresponding to the at least one path of the at least one location reference; and a processor 210 to reconstruct the at least one path of the at least one location reference at the device (200), based upon the computed at least one location reference enhanced by at least one focusing factor. A non-limiting example embodiment of such an end user mapping device 200 will be explained as follows.

FIG. 1 is an illustrative representation of electronic components of an end user mapping device 200 according to an example embodiment of the present invention in block component format. It should be noted that the block diagram of the end user mapping device 200 is not inclusive of all components of the mapping device, but is only representative of many example components.

The end user mapping device 200 is located within a housing (not shown). The housing includes a processor 210 connected to an input device 220 and a display screen 240. The input device 220 can include but is not limited to a keyboard device, voice input device, touch panel and/or any other known input device utilized to input information; and the display screen 240 can include any type of display screen such as an LCD display, for example. In a particular example arrangement the input device 220 and display screen 240 are integrated into an integrated input and display device, including a touchpad or touch-screen input so that a user need only touch a portion of the display screen 240 to select one of a plurality of display choices or to activate one of a plurality of virtual buttons.

The end user mapping device 200 may include an output device 260, in addition to, or instead of a display device 240, for example an audible output device (e.g. a loudspeaker), a text output device, etc. As output device 260 can produce audible information for a user of the navigation device 200, it is should equally be understood that input device 220 can include a microphone and software for receiving input voice commands as well.

In the navigation device 200, processor 210 is operatively connected to and set to receive input information from input device 220 via a connection 225, and operatively connected to at least one of display screen 240 and output device 260, via output connections 245, to output information thereto. Further, the processor 210 is operably coupled to a memory resource 230 via connection 235 and is further adapted to receive/send information from/to input/output (I/O) ports 270 via connection 275, wherein the I/O port 270 is connectable to an I/O device 280 external to the navigation device 200. The memory resource 230 may store a digital map application database (or even, in at least one instance of one example embodiment wherein the end user mapping device 200 has enough memory storage capacity, a source database) as discussed in any of the embodiments of the present invention discussed above and comprises, for example, a volatile memory, such as a Random Access Memory (RAM) and a non-volatile memory, for example a digital memory, such as a flash memory. The external I/O device 280 may include, but is not limited to an external listening device such as an earpiece for example. The connection to I/O device 280 can further be a wired or wireless connection to any other external device such as a car stereo unit for hands-free operation and/or for voice activated operation for example, for connection to an ear piece or head phones, and/or for connection to a mobile phone for example, wherein the mobile phone connection may be used to establish a data connection between the end user mapping device 200 and the internet or any other network for example, and/or to establish a connection to a server via the internet or some other network for example.

FIG. 1 further illustrates an operative connection between the processor 210 and an antenna/receiver 250 via connection 255, wherein the antenna/receiver 250 can be a GPS antenna/receiver for example. It will be understood that the antenna and receiver designated by reference numeral 250 are combined schematically for illustration, but that the antenna and receiver may be separately located components, and that the antenna may be a GPS patch antenna or helical antenna for example.

Further, it will be understood by one of ordinary skill in the art that the electronic components shown in FIG. 1 are powered by power sources (not shown) in a conventional manner. As will be understood by one of ordinary skill in the art, different configurations of the components shown in FIG. 1 are considered to be within the scope of the present application. For example, the components shown in FIG. 1 may be in communication with one another via wired and/or wireless connections and the like. Thus, the scope of the end user mapping device 200 of the present application includes a portable or handheld navigation device, other portable or hand-held mapping devices and/or includes an in-vehicle devices such as in-vehicle navigation device.

In addition, the portable or handheld end user mapping device 200 of FIG. 1 can be connected or "docked" in a known manner to a vehicle such as a bicycle, a motorbike, a car or a boat for example. Such an end user mapping device 200 is then removable from the docked location for portable or handheld navigation use.

Further, in at least one embodiment, not only can the end user mapping device 200 store a newly created digital map application database in memory 230, but the end user mapping device 200 can perform operations of embodiments of the method of embodiments described hereafter using processor 210 of the end user mapping device 200 itself when receiving information (via antenna/receiver 250 for example, as discussed above). For example, the method of FIG. 10 can be performed, in at least one alternative embodiment, by processor 210 and receiver 250 within end user mapping device 200, with the newly received location reference enhanced by a focusing factor, from server 302.

In general terms, a modern end user mapping device 200 comprises a processor 210, memory 230 (at least one of volatile and non-volatile, and commonly both), and map data stored within the memory. The processor 210 and memory 230 cooperate to provide an execution environment in which a software operating system may be established, and additionally it is commonplace for one or more additional software programs to be provided to enable the functionality of the end user mapping device 200 to be controlled, and to provide various other functions.

Typically these devices further comprise one or more input interfaces 220 that allow a user to interact with and control the device, and one or more output interfaces 240, 260 by which information may be relayed to the user. Illustrative examples of output interfaces include a visual display and a speaker for audible output. Illustrative examples of input interfaces include one or more physical buttons to control on/off operation or other features of the device (which buttons need not necessarily be on the device itself but could be on a steering wheel if the device is built into a vehicle), and a microphone for detecting user speech. In a particularly preferred arrangement the output interface display 240 may be configured as a touch sensitive display (by way a touch sensitive overlay or otherwise) to additionally provide an input interface by which a user can operate the device by touch.

Devices of this type will also often include one or more physical connector interfaces by which power and optionally data signals can be transmitted to and received from the device, and optionally one or more wireless transmitters/receivers to allow communication over cellular telecommunications and other signal and data networks, for example Wi-Fi, Wi-Max GSM and the like.

End user mapping devices 200 of this type may also include a GPS antenna (antenna/receiver 250) of which satellite-broadcast signals, including location data from a server 302 and/or from GPS satellites, can be received and subsequently processed to determine a current location of the device.

The end user mapping device 200 may also include electronic gyroscopes, accelerometers and wheel sensors which produce signals that can be processed to determine the current angular and linear acceleration, and in turn, and in conjunction with location information derived from the GPS signal, velocity and relative displacement of the device and thus the vehicle in which it is mounted. Typically such features are most commonly provided in in-vehicle navigation systems, but may also be provided in end user mapping devices 200 if it is expedient to do so.

The utility of such end user mapping devices 200 is manifested primarily in their ability to determine a route between a first location (typically a start or current location) and a second location (typically a destination). These locations can be input by a user of the end user mapping device 200, by any of a wide variety of different methods, for example by postcode, street name and house number, previously stored "well known" destinations (such as famous locations, municipal locations (such as sports grounds or swimming baths) or other points of interest), and favorite or recently visited destinations.

Typically, the end user mapping device 200 is enabled by software for computing a "best" or "optimum" route between the start and destination address locations from the map data. A "best" or "optimum" route is determined on the basis of predetermined criteria which may not necessarily be the fastest or shortest route. The selection of the route along which to guide the driver can be very sophisticated, and the selected route may take into account existing, predicted and dynamically and/or wirelessly received traffic and road information, historical information about road speeds, and the driver's own preferences for the factors determining road choice (for example the driver may specify that the route should not include motorways or toll roads).

In addition, the device 200 may continually monitor road and traffic conditions, and offer to or choose to change the route over which the remainder of the journey is to be made due to changed conditions. Real time traffic monitoring systems, based on various technologies (e.g. mobile phone data exchanges, fixed cameras, GPS fleet tracking) are being used to identify traffic delays and to feed the information into notification systems.

End user mapping devices 200 of this type may typically be mounted on the dashboard or windscreen of a vehicle, but may also be formed as part of an on-board computer of the vehicle radio or indeed as part of the control system of the vehicle itself (in-vehicle navigation devices). The end user mapping device 200 may also be part of a hand-held system, such as a PDA (Portable Digital Assistant) a media player, a mobile phone or the like, and in these cases, the normal functionality of the hand-held system is extended by means of the installation of software on the device to perform both route calculation and navigation along a calculated route. Thus, the term navigation device, used throughout the application, encompasses any of the above.

Route planning and navigation functionality may also be provided by a desktop or mobile computing resource running appropriate software. For example, the Royal Automobile Club (RAC) provides an on-line route planning and navigation facility at http://www.rac.co.uk, which facility allows a user to enter a start point and a destination whereupon the server to which the user's PC is connected calculates a route (aspects of which may be user specified), generates a map, and generates a set of exhaustive navigation instructions for guiding the user from the selected start point to the selected destination. The facility also provides for pseudo three-dimensional rendering of a calculated route, and route preview functionality which simulates a user travelling along the route and thereby provides the user with a preview of the calculated route.

In the context of an end user mapping device 200, once a route has been calculated, the user interacts with the end user mapping device 200 to select the desired calculated route, optionally from a list of proposed routes. Optionally, the user may intervene in, or guide the route selection process, for example by specifying that certain routes, roads, locations or criteria are to be avoided or are mandatory for a particular journey. The route calculation aspect of the end user mapping device forms one primary function, and direction giving along such a route is another primary function.

During direction giving along a calculated route, it is usual for such end user mapping devices 200 to provide visual and/or audible instructions to guide the user along a chosen route to the end of that route, i.e. the desired destination. It is also usual for end user mapping devices 200 to display map information on-screen during this navigation phase, such information regularly being updated on-screen so that the map information displayed is representative of the current location of the device, and thus of the user or user's vehicle if the device is being used for in-vehicle navigation.

An icon displayed on-screen typically denotes the current device location, and is centered with the map information of current and surrounding roads in the vicinity of the current device location and other map features also being displayed. Additionally, navigation information may be displayed, optionally in a status bar above, below or to one side of the displayed map information, examples of navigation information include a distance to the next deviation from the current road required to be taken by the user, the nature of that deviation possibly being represented by a further icon suggestive of the particular type of deviation, for example a left or right turn. The navigation function also determines the content, duration and timing of audible instructions by means of which the user can be guided along the route. As can be appreciated a simple instruction such as "turn left in 100 m" requires significant processing and analysis. As previously mentioned, user interaction with the device may be by a touch screen, or additionally or alternately by steering column mounted remote control, by voice activation or by any other suitable method.

A further important function provided by the end user mapping device 200 is automatic route re-calculation in the event that: a user deviates from the previously calculated route during navigation (either by accident or intentionally); real-time traffic conditions (locations of a traffic jam, road closure, etc. is received from a server 302, transmitted in packets and enhanced by at least one focusing factor (as will be discussed below) dictate that an alternative route may be more expedient and the device is suitably enabled to recognize such conditions automatically, or if a user actively causes the device to perform route re-calculation for any reason.

A route may be calculated with user defined criteria; for example, the user may prefer a scenic route to be calculated by the device, or may wish to avoid any roads on which traffic congestion is likely, expected or currently prevailing. The device software would then calculate various routes and weigh more favorably those that include along their route the highest number of points of interest (known as POIs) tagged as being for example of scenic beauty, or, using stored information indicative of prevailing traffic conditions on particular roads, order the calculated routes in terms of a level of likely congestion or delay on account thereof. Other POI-based and traffic information-based route calculation and navigation criteria are also possible.

Although the route calculation and navigation functions are fundamental to the overall utility of end user mapping devices 200, it is possible to use the end user mapping device 200 purely for information display, or "free-driving", in which only map information relevant to the current device location is displayed, and in which no route has been calculated and no direction giving is currently being performed by the device. Such a mode of operation is often applicable when the user already knows the route along which it is desired to travel and does not require navigation assistance.

Such navigation devices 200 are of great utility when the user is not familiar with the route to the destination that they are navigating to. However, whilst the end user mapping device 200 is very useful in guiding the user to the destination, the user's unfamiliarity with the destination means that the user does not know what to expect. For example, a user traveling to a street address may not know what the building looks like and hence how to recognize the building, where the entrance to the building is, what the local environment looks like, or indeed where local facilities (such as car parking for example) are located.

These uncertainties can inconvenience and stress the user of the navigation device 200. Moreover, they can significantly add to the user's journey time as the user may have to spend a considerable amount of time actually locating the destination and, for example, appropriate nearby car parking facilities. These uncertainties affect end user mapping device 200 and in-vehicle navigation device users as well as users making use of route planning functionality from a computer, for example from a desktop computer at home or work.

Figure 2:
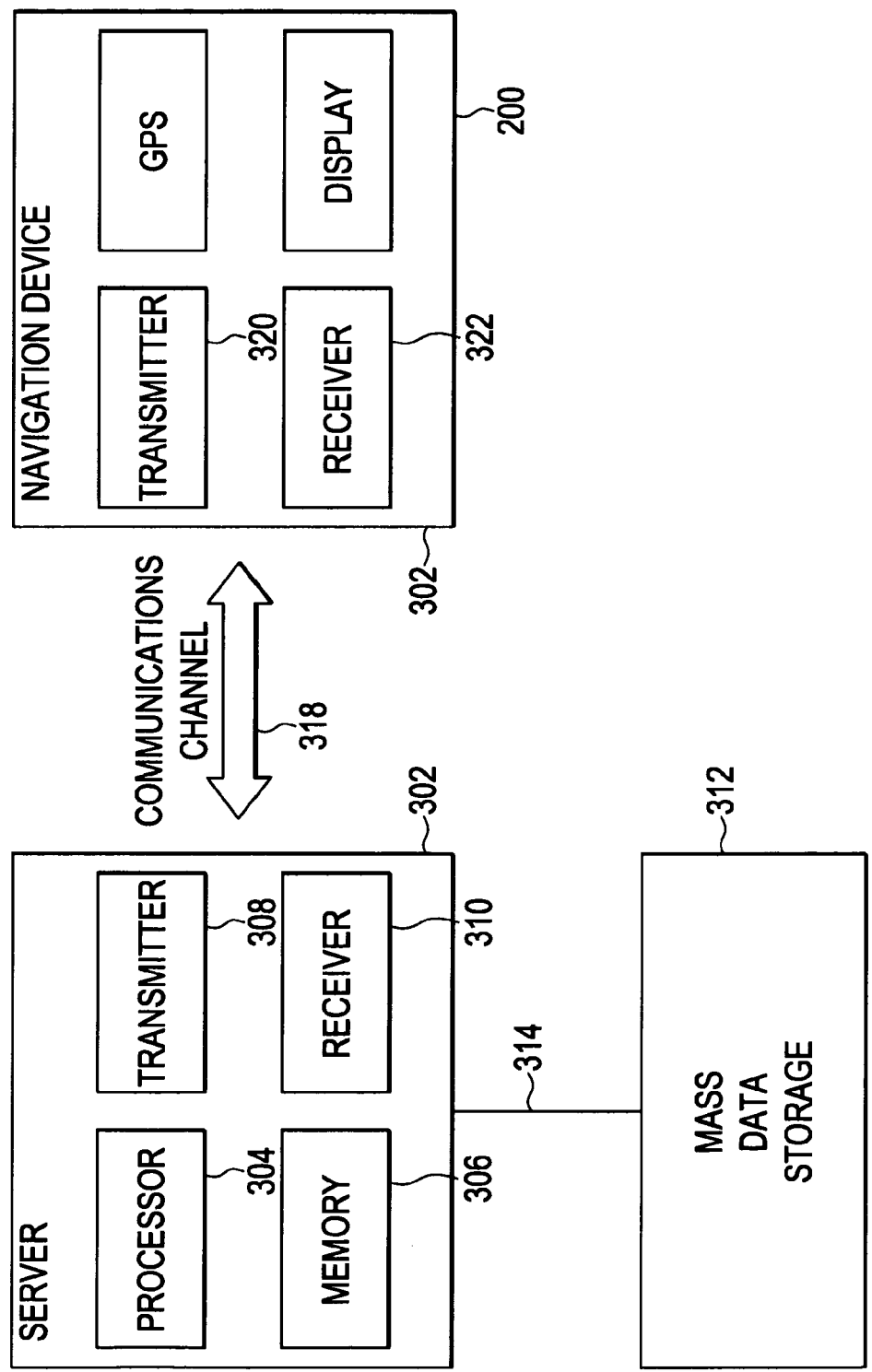
FIG. 2 illustrates an example embodiment where a navigation device may receive information over a wireless communication channel from a server.

Referring now to FIG. 2, the end user mapping device 200 may establish a "mobile" or telecommunications network connection with a server 302 via a mobile device (not shown) (such as a mobile phone, PDA, and/or any device with mobile phone technology) establishing a digital connection (such as a digital connection via known Bluetooth technology for example); or through antenna/receiver 250 assuming it includes mobile phone or other capabilities, for example. Thereafter, through its network service provider, the mobile device can establish a network connection (through the interne for example) with a server 302. As such, a "mobile" network connection may be established between the end user mapping device 200 (which can be, and often times is mobile as it travels alone and/or in a vehicle) and the server 302 to provide a "real-time" or at least very "up to date" gateway for information. As such, the end user mapping device 200 can receive and later store in memory 230, newly received location information and focusing factors, created by the embodiments of the method to describe with regard to FIGS. 3-10 for example. Although only one end user mapping device 200 is shown in FIG. 2, it should be understood that a plurality of similar end user mapping devices 200 could similarly operate when receiving information broadcast from server 302. Such aspects of information broadcasting are known and will not be further described for the sake of brevity.

The establishing of the network connection between the mobile device (via a service provider) and/or end user mapping device 200 with mobile device capabilities built in antenna/receiver 250, and another device such as the server 302, using an internet (such as the World Wide Web) for example, can be done in a known manner. This can include use of TCP/IP layered protocol for example. The mobile device can utilize any number of communication standards such as CDMA, GSM, WAN, etc. As such, the end user mapping device 200 can receive and later store in memory 230, newly received location references enhanced by focusing factors for use in location reference reconstruction and subsequent re-routing to avoid or at least reconsider travel over locations such as traffic jams, road closures, etc. reconstructed by the embodiments of the method described hereafter with regard to FIGS. 3-10 for example. Further, the end user mapping device 200 can not only receive, but can also send information to the server 302, for subsequent use in the server 302 obtaining further information for broadcast to other remote devices. Thus, communication between any end user mapping device 200 and server 302 may be a two way communication.

As such, an internet connection may be utilized which is achieved via data connection, via a mobile phone or mobile phone technology within the antenna/receiver 250 of the end user mapping device 200 for example. For this connection, an internet connection between the server 302 and the end user mapping device 200 is established. This can be done, for example, through a mobile phone or other mobile device and a GPRS (General Packet Radio Service)-connection (GPRS connection is a high-speed data connection for mobile devices provided by telecom operators; GPRS is a method to connect to the internet).

The end user mapping device 200 can further complete a data connection with the mobile device, and eventually with the internet and server 302, via existing Bluetooth technology for example, in a known manner, wherein the data protocol can utilize any number of standards, such as the GSRM, the Data Protocol Standard for the GSM standard, for example. As such, the end user mapping device 200 can receive and later store the received location reference in memory 230, including received information for use in reconstructing at least one path of the location reference based upon the embodiments of the method described hereafter with regard to FIGS. 3-10 for example.

The end user mapping device 200 may include its own mobile phone technology within the end user mapping device 200 itself (including an antenna for example, or optionally using the internal antenna/receiver 250 of the navigation device 200). The mobile phone technology within the end user mapping device 200 can include internal components as specified above, and/or can include an insertable card (e.g. Subscriber Identity Module or SIM card), complete with necessary mobile phone technology and/or an antenna for example, each of which can be used as a "receiver", to receive location reference information enhanced by a focusing factor for use in reconstructing at least one path of the location reference based upon the embodiments of the method described hereafter with regard to FIGS. 3-10 for example.

As such, mobile phone technology within the end user mapping device 200 can similarly establish a network connection between the end user mapping device 200 and the server 302, via the internet for example, in a manner similar to that of any mobile device. As such, the end user mapping device 200 can receive and later store in memory 230, received location reference information enhanced by a focusing factor for use in reconstructing at least one path of the location reference based upon the embodiments of the method described hereafter with regard to FIGS. 3-10 for example.

For GRPS phone settings, a Bluetooth enabled navigation device may be used to correctly work with the ever changing spectrum of mobile phone models, manufacturers, etc., model/manufacturer specific settings may be stored on the end user mapping device 200 for example. The data stored for this information can be updated.

In FIG. 2 the end user mapping device 200 is depicted as being in communication with the server 302 via a generic communications channel 318 that can be implemented by any of a number of different arrangements (again, this can represent a plurality of end user mapping devices 200 for receipt of broadcast information from server 302, and for individual sending of information to server 302). The server 302 and a end user mapping device 200 can communicate when a connection via communications channel 318 is established between the server 302 and the end user mapping device 200 (noting that such a connection can be a data connection via mobile device, a direct connection via personal computer via the internet, etc.). As such, the end user mapping device 200 can receive and later store in memory 230, newly received location reference information enhanced by a focusing factor for use in reconstructing at least one path of the location reference based upon the embodiments of the method described hereafter with regard to FIGS. 3-10 for example. Accordingly, the method of an embodiment of the invention aims at enhancing dynamic location reference with information which aids in faster and less ambiguous decoding of the LR on the remote device, independently of map data origin or format, for the purpose of routing around the location, or otherwise making the user aware of relevant dynamic content.

The server 302 includes, in addition to other components which may not be illustrated, a processor 304 operatively connected to a memory 306 and further operatively connected, via a wired or wireless connection 314, to a mass data storage device 312. The processor 304 is further operatively connected to transmitter 308 and receiver 310, to transmit and send information to and from remote devices such as end user mapping device 200 (noting that the "remote device" as referenced throughout the present application may include navigation devices and/or other servers or remote databases) via communications channel 318 (and/or to receive/send information to/from other databases, such as a database from which traffic location information is received regarding traffic jams, road closures, etc.). The signals sent and received may include data, communication, and/or other propagated signals. The transmitter 308 and receiver 310 may be selected or designed according to the communications requirement and communication technology used in the communication design for the navigation system 200. Further, it should be noted that the functions of transmitter 308 and receiver 310 may be combined into a single transceiver.

Server 302 is further connected to (or includes) a mass storage device 312, noting that the mass storage device 312 may be coupled to the server 302 via communication link 314. The mass storage device 312 contains a store of navigation data and map information, and can again be a separate device from the server 302 or can be incorporated into the server 302.

The end user mapping device 200 (or any other remote device, or any other of a plurality of remote devices) is adapted to communicate with the server 302 through communications channel 318, and includes processor 210, memory 230, etc. as previously described with regard to FIG. 1, as well as transmitter 320 and receiver 322 to send and receive signals and/or data through the communications channel 318, noting that these devices can further be used to communicate with devices other than server 302. Further, the transmitter 320 and receiver 322 are selected or designed according to communication requirements and communication technology used in the communication design for the end user mapping device 200 and the functions of the transmitter 320 and receiver 322 may be combined into a single transceiver. As such, the end user mapping device 200 can receive and later store in memory 230, newly received location information and focusing factors for use in re-routing to avoid location references. created by the embodiments of the method described hereafter with regard to FIGS. 3-10 for example.

Software stored in server memory 306 provides instructions for the processor 304 and allows the server 302 to provide services to the navigation device 200. One service provided by the server 302 involves processing requests from the end user mapping device 200 and transmitting navigation data from the mass data storage 312 to the navigation device 200. Another service provided by the server 302 includes processing the navigation data using various algorithms for a desired application and sending the results of these calculations to the navigation device 200.

The communication channel 318 generically represents the propagating medium or path that connects the end user mapping device 200 and the server 302. Both the server 302 and end user mapping device 200 include a transmitter for transmitting data through the communication channel and a receiver for receiving data that has been transmitted through the communication channel.

The communication channel 318 is not limited to a particular communication technology. Additionally, the communication channel 318 is not limited to a single communication technology; that is, the channel 318 may include several communication links that use a variety of technology. For example, the communication channel 318 can be adapted to provide a path for electrical, optical, and/or electromagnetic communications, etc. As such, the communication channel 318 includes, but is not limited to, one or a combination of the following: electric circuits, electrical conductors such as wires and coaxial cables, fiber optic cables, converters, radio-frequency (RF) waves, the atmosphere, empty space, etc. Furthermore, the communication channel 318 can include intermediate devices such as routers, repeaters, buffers, transmitters, and receivers, for example.

In one illustrative arrangement, the communication channel 318 includes telephone and computer networks. Furthermore, the communication channel 318 may be capable of accommodating wireless communication such as radio frequency, microwave frequency, infrared communication, etc. Additionally, the communication channel 318 can accommodate satellite communication.

The communication signals transmitted through the communication channel 318 include, but are not limited to, signals as may be required or desired for given communication technology. For example, the signals may be adapted to be used in cellular communication technology such as Time Division Multiple Access (TDMA), Frequency Division Multiple Access (FDMA), Code Division Multiple Access (CDMA), and Global System for Mobile Communications (GSM), etc. Both digital and analogue signals can be transmitted through the communication channel 318. These signals may be modulated, encrypted and/or compressed signals as may be desirable for the communication technology.

The server 302 includes a remote server accessible by the end user mapping device 200 or any other remote device via a wireless channel. The server 302 may include a network server located on a local area network (LAN), wide area network (WAN), virtual private network (VPN), etc.

The server 302 may include a personal computer such as a desktop or laptop computer, and the communication channel 318 may be a cable connected between the personal computer and the navigation device 200. Alternatively, a personal computer may be connected between the end user mapping device 200 and the server 302 to establish an internet connection between the server 302 and the remote devices, including end user mapping device 200 for example. Alternatively, a mobile telephone or other handheld device may establish a wireless connection to the interne, for connecting the end user mapping device 200 to the server 302 via the interne. As such, the end user mapping device 200 can receive and later store in memory 230, newly received location reference information enhanced by a focusing factor for use in reconstructing at least one path of the location reference based upon the embodiments of the method described hereafter with regard to FIGS. 3-10 for example.

The end user mapping device 200 may be provided with information, such as map database information in the form of a digital map application database for example, generated from the digital map source database from the server 302 via information downloads which may be periodically updated automatically (such as map or map database information for example) or upon a user connecting end user mapping device 200 to the server 302 and/or may be more dynamic upon a more constant or frequent connection being made between the server 302 and end user mapping device 200 via a wireless mobile connection device and TCP/IP connection for example (to receive information including location reference information enhanced by a focusing factor for use in reconstructing at least one path of the location reference based upon the embodiments of the method described hereafter with regard to FIGS. 3-10 for example). For many dynamic calculations, the processor 304 in the server 302 may be used to handle the bulk of the processing needs as will be discussed hereafter, however, processor 210 of end user mapping device 200 can also handle processing and calculation for re-routing based upon received location reference information enhanced by a focusing factor for use in reconstructing at least one path of the location reference based upon the embodiments of the method described hereafter with regard to FIGS. 3-10 for example, oftentimes independent of a continued connection to the server 302. Again, as would be understood by one of ordinary skill in the art, any of the techniques of embodiments of the methods of the present application described hereafter, are equally applicable to the digital map database of the end user mapping device 200 discussed herein.

As indicated above in FIG. 1, an end user mapping device 200 includes a processor 210, an input device 220, and a display screen 240. The input device 220 and display screen 240 may be integrated into an integrated input and display device to enable both input of information (via direct input, menu selection, etc.) and display of information through a touch panel screen, for example. Such a screen may be a touch input LCD screen, for example, as is well known to those of ordinary skill in the art. Further, the end user mapping device 200 can also include any additional input device 220 and/or any additional output device 260, such as audio input/output devices for example.

Digital map databases are known to include address segment vectors or street segments having starting and ending points, street names and other types of attributes, and address ranges representing assigned addresses on that segment. Such digital map databases (map databases) are used in geocoding, GIS and navigation techniques, for example, when locating a place, such as a desired travel destination for example (for example, selected or input through an integrated input and display device of a navigation device for example). Digital map databases (for example, digital map databases that are commonly maintained by vendors of digital map databases and referred herein as digital map source databases) can be stored in a central server 302 (and can be accessed directly for geocoding applications for example), and reduced versions thereof (referenced herein as digital map application databases) can be downloaded or otherwise transferred to memories of devices including but not limited to geocoding devices, in-vehicle navigation devices, personal navigation devices and/or any other devices with navigation capabilities including but not limited to cell phones, PDAs, etc. and/or can be stored in a memory or stored on any type of digital media. Such digital map source databases can include address segment vectors (and/or address sub-segment vectors which will be discussed hereafter) including many types of attributes assigned to the stored address segment vectors (and/or address sub-segment vectors). Typically, digital map application databases will be formed from such digital map source databases and will include address segment vectors (and/or address sub-segment vectors which will be discussed hereafter) with a relatively fewer number of types of attributes assigned to the stored address segment vectors (and/or address sub-segment vectors). Techniques for forming such digital map application databases from digital map source databases and/or copying portions of digital map source databases to form the digital map application databases are known to those of ordinary skill in the art and will not be discussed herein for the sake of brevity.

Such digital map application databases are typically downloadable to an end user mapping device 200, or any other remote device with geocoding and/or navigation capabilities and/or mapping capabilities, by the device accessing and downloading or copying new digital map application databases from the server, periodically via the internet or a mobile network connection for example (such as every few months when new information is received for example), or for in-vehicle navigation devices, by a new updated digital map application database being stored on a CD-ROM for example, wherein the CD-ROM then can be input into the in-vehicle navigation device of the vehicle to update the digital map application database stored in the memory of the in-vehicle navigation device. Such updating techniques are not limited to those discussed above and can include any technique for updating digital map application databases, and are known to those of ordinary skill in the art and will not be discussed herein for the sake of brevity.

Figure 3:
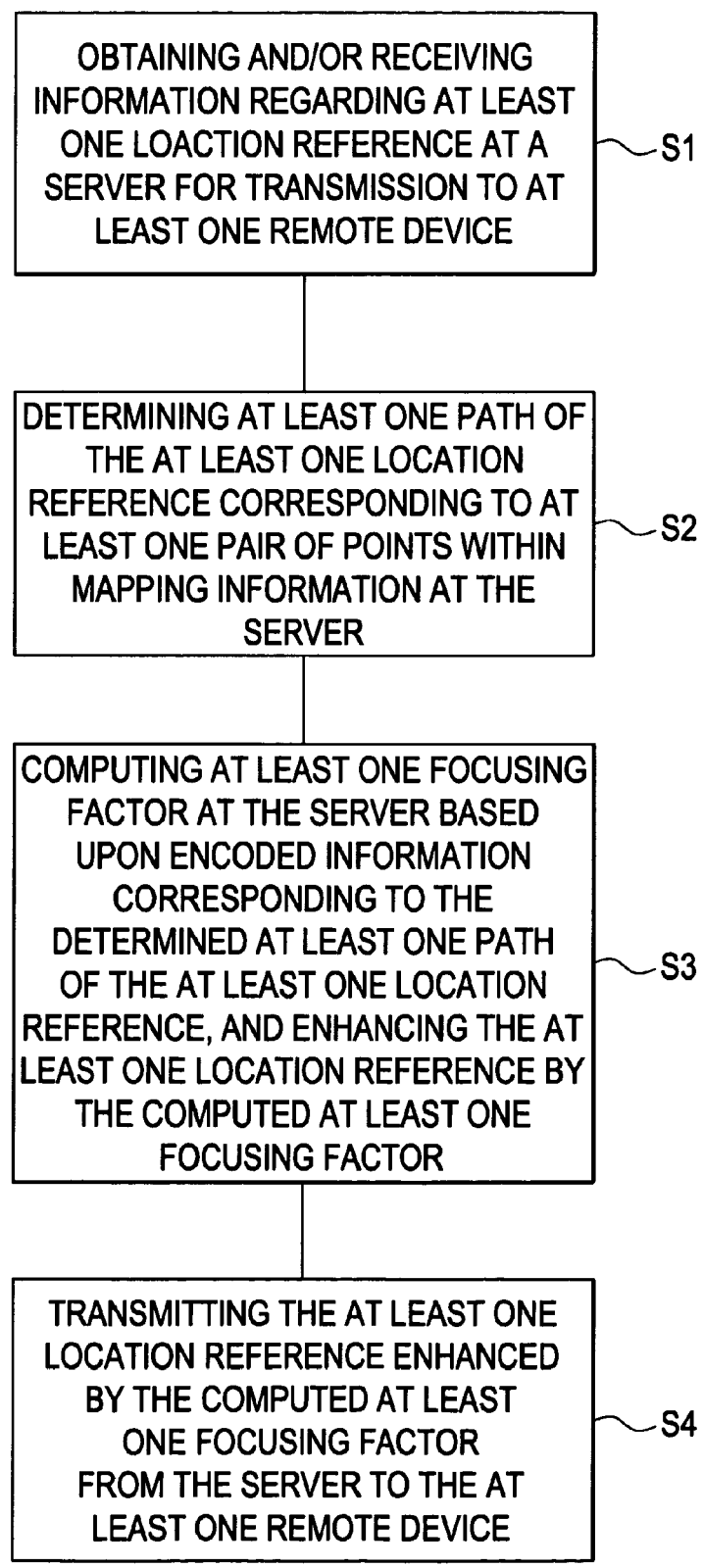
FIG. 3 illustrates an example of an embodiment of a method of the present application.

At least one embodiment of the present application is directed toward encoding and decoding of linear location references when a path needs to be computed twice: first as part of a location encoding process, and then as part of path reconstruction step in location reference decoding process. In at least one embodiment of the present application, location reference information is conveyed in a more universally useable manner and/or conveyed in a manner which improves the decoding process at the remote device (such as an end user mapping device, for example), by reducing path search area, for example, and thus the number of nodes to be processed during path reconstruction in the decoding process by making use of properties of the corresponding path computed during the encoding process. Reducing path search area can be achieved by computing and using a search area focusing factor to enhance a location reference before transmission, the focusing factor including but not limited to heuristic value; path distance limiting the search by elliptical area; path node deviation values; etc. In at least one embodiment of the present application each path in the LR should have a corresponding focusing factor and the same type of the focusing factor should be used by encoding and decoding processes. In at least one embodiment, to increase the speed of path reconstruction, focusing factor(s) for a given LR can be sent to the decoding device as part of the LR, or optionally the encoding and decoding devices can use agreed upon default focusing factors for the subset of paths that fit such default focusing factor An embodiment of the present application is directed to a method. As shown in FIG. 3, a method of an embodiment of the present application may include: S1 at least one of obtaining and receiving information regarding at least one location reference (the information including, for example, a location of the location reference, the location reference itself, etc.) at a server 302 for transmission to at least one remote device 200; S2 determining at least one path of the at least one location reference corresponding to at least one pair of points within mapping information (between the location reference routing points for example) at the server 302; S3 computing at least one focusing factor at the server 302 based upon encoded information corresponding to the determined at least one path of the at least one location reference (such as shortest path properties for example) and enhancing the at least one location reference by the computed at least one focusing factor; and S4 transmitting the at least one location reference enhanced by the computed at least one focusing factor from the server 302 to the at least one remote device 200.

The encoding may employ one or more shortest path computations, corresponding to the number of consecutive routing point pairs (for the purpose of explanation, let us consider a start and an end point of a location reference to be a routing point). In an embodiment of the present application, at least one focusing factor is computed at the server 302, for each of at least one or more contiguous paths of the location reference to aid in reconstructing one or more corresponding paths of the location reference. The location reference (LR) path(s) can be defined by segments (referred herein as paths) between pairs of start/end/routing points (referred collectively herein as routing points), for example, at the server 302; the server 302 then enhancing the location reference by the computed focusing factor and transmitting the at least one location reference enhanced by the at least one focusing factor (noting that multiple location references may be transmitted to and received by one or more remote devices, each broadcast as a message in packets for example) to the at least one remote device.

In at least one embodiment, the at least one location reference enhanced by at least one focusing factor is usable by the at least one remote device 200 in reconstructing the at least one path of the location reference, which can thereafter be used in route reconstruction. More specifically, in at least one embodiment, the at least one location reference enhanced by the at least one focusing factor is useable by the at least one remote device 200 in determining a search area in reconstruction of the at least one path of at least one the location reference; and in one example embodiment, a reduced search area (such as a relatively elliptical search area for example). Further, in at least one embodiment, the at least one location reference enhanced by the at least one focusing factor is usable in regulating node filtering in reconstruction of at least one path of the at least one location reference.

In at least one embodiment of the present application, the method described above is usable in processing a received location reference at a server 302 corresponding to at least one pair of routing points within spatial content information (e.g. map data) stored at the server 302. An encoded location reference usually includes starting and ending points, and typically is stored along with routing points or their equivalents, spatial markers, to help disambiguate a location on an encoding device, wherein routing points are placed along a location reference such that connecting paths or path segments between each consecutive pair of routing points coincide with the shortest path between them (noting that within the embodiments of present application, starting, ending and other routing points are considered "routing points" and path segments of a location reference are considered as "paths", such that a location reference may include one or more paths, each running between a pair of routing points). As explained above, map databases may vary in content and organization so the conveying of map coordinate information via merely latitude and longitude may result or may not result in a receiving remote device (such as an end user mapping device 200, which could be a navigation device) being able to reconstruct the path(s) of the location reference.

Depending on the accuracy of the map information stored in the memory 230 of the remote end user mapping device 200 for example, or the encoding server device 302, if only absolute latitude and longitude information were received, location reference information may be significantly off and pinpoint a wrong location on the remote device (end user mapping devices 200) during decoding or reconstruction of the at least one path of the location reference. In addition, in such as end user mapping devices 200, while encoding information on a server 302 may be efficient as capabilities of the processor 304 may be much stronger than that of the remote navigation device 200, decoding or reconstruction of the at least one path of the location reference using path computation in the processor 210 of the end user mapping device 200 may be significantly slower. Using focusing factor(s), as is done in embodiments of the present application, allows for faster shortest path computation during the LR decoding process and facilitates fewer LR messages being dropped at the remote device when the decoding queue overflows or decoding process times out, for example.

Accordingly, the method of an embodiment of the present application aims at providing information wherein information regarding a location reference (a location of and/or the location reference itself for example) is received or obtained from any of another end user mapping device 200, another server, etc., and a path(s) of the location reference is determined or otherwise reconstructed corresponding to a pair(s) of points within mapping information at the server 302. Based upon an embodiment of the present application, at least one focusing factor can be computed based upon the encoded information and the location reference can be enhanced by the computer at least one focusing factor, and then conveyed or transmitted to a remote device such as end user mapping device 200 in a way which is not dependent upon a particular mapping database stored in memory 230 of the navigation device for example, and which improves the speed of the decoding (for subsequent use such as for rerouting around the location reference, etc.) at the remote device.

As explained above, mapping information may be encoded and stored at server 302, utilizing a memory 306, potentially along with a mass data storage 312 for example. In modern times, map geometry, topology and connectivity reflecting objective reality of a road network are digitized based on large scale aerial and satellite images and highly accurate field data collection units. While map data from different providers will not coincide, at least in high-traffic areas data quality and links travel distances are expected not to be far off. This improves chances of successful LR decoding when an LR reconstruction method uses a sequence of shortest paths, in addition to other attributes.

As stated above, the method of at least one embodiment of the present application aims to both increase location referencing success rate and decrease computing time in the path reconstruction step of the decoding process.

In an embodiment of the present application, the inventor has recognized that, while determining one of more paths that are a part of a location reference, the server 302 may derive and pass-on to the end user mapping device 200 knowledge about properties of the computed path(s) of the location reference(s) that may speed-up reconstruction of the path(s) during the LR decoding process at the end user mapping device 2. Accordingly, in the method of an embodiment of the present application, the server 302 can enhance a location reference to be sent to a decoding device such as a end user mapping device 200, with at least one computed focusing factor that can include, but is not limited to, one focusing factor for each shortest path in the encoded location reference. To obtain benefit of embodiments of the present application, focusing factors, such as dynamic computed focusing factors for example, should be added to information pertaining to each path of the location reference, to thereby enhance the location reference by the computed focusing factor for subsequent transmission to the remote device(s).

Typically the processor 304 may include relatively stronger processing capabilities than processors 210 of end user mapping devices 200 for example, wherein the at least one computed focusing factor will thereby help increase speed at the remote decoding device, such as a end user mapping device 200 for example, in reconstructing the at least one path of the location reference (and thus take faster action on the decoding device if the decoded LR and its content are relevant to the user travel plans). However, powerful decoding devices, such as a server, decoding high loads of LRs may also benefit from faster computation. Thus, it should be noted that although embodiments of the present application generally discuss a server computing focusing factors and transmitting enhanced location references, and although embodiments of the present application generally discuss an end user mapping or other remote device receiving enhanced location references, enhanced by focusing factors, other servers may be the remote devices receiving the enhanced location references (server to server, for example) and even, if processing power permits, end user mapping devices may compute location references with focusing factors and transmit enhanced location references (to remote devices which may be servers, end user mapping devices, etc.). Thus, a key aspect of at least one embodiment of the present application is modifying a location reference to enhance the decoding process at a remote device. Faster decoding may be achieved as follows.

The decoding process includes reconstructing paths between routing points of a LR. For example, the location reference may be a reference to a traffic jam, which may be one a stretch of a highway, or may be a more complex set of road segments that describe, for example, a path from a baseball stadium to a freeway entrance (just after a game ends, for example). Dynamic content pertaining to a location reference may be received or otherwise obtained by the server 302, which then wants to broadcast, for example, the location reference to remote devices, such as end user mapping devices 200 or other servers for example.

In an embodiment of the present application, the server 302 uses map information in memory 306 and/or in mass storage 312 to encode the received or obtained LR. In the process, it defines routing points and computes shortest paths between points to cover the entire reference location, for example, from a start point (s) to a first routing point (rp1), a path from rp1 to a second routing point rp2, and a third path from rp2 to and end point (e). Points s, rp1, rp2, and e are normally included in the LR encoding. For each shortest path within the location reference, the encoding process adds a focusing factor for example, to facilitate faster path reconstruction on a decoding device. A focusing factor is designed to reduce path search area during the path computation of the location reference encoding process employed on a server 302 for example, or location reference path reconstruction or decoding on a remote device (such as end user mapping device 200 for example). The speed of path computation may be viewed as being proportional to the number of nodes explored. Normally path search area cannot be limited arbitrarily, lest a "shortest" path will not be found, or a computed path may not be the "shortest" under a defined cost criteria.

The inventors have discovered, in an embodiment of the present application, that the field of location referencing has a unique advantage. Since LR path(s) are computed in the encoding process, an focusing factor for limiting path search area can be derived or computed from the properties of each path of a location reference, based on its deviation from the straight line connecting its routing points for example, during that path computation (specifically, the path back-tracing step) on the server 302. These focusing factors, for each path of the LR, can be then included in the LR encoding (enhancing the LR by the focusing factor(s)) to limit the search area for that path without a penalty when used during a path reconstruction process. The term focusing factor includes, but is not limited to, a path cost heuristic parameter or value; a path distance relating to a reduced search area such as an ellipse for example; and/or path extent deviation values. Computation of these parameters or values during the encoding process on the server 302, and consequent use during the decoding are explained below. The at least one focusing factor can then be used to enhance the location reference can then be transmitted to the at least one remote device, such as an end user mapping device 200 for example. As such, the location reference enhanced by the at least one focusing factor can be used at the remote device in recon-structing the at least one path of the location reference in a manner which accurately conveys the location reference and which includes a small amount of transmitted information (and thus a small amount of received and processed infor-mation at the end user mapping device 200).

On the side of the end user mapping device 200 (or other remote device or devices), the end user mapping device 200 can use the transmitted information to reconstruct the at least one path of the location reference. This can be done irre-spective of the map version or map vendor of the map stored at the end user mapping device, as the received information is only a definition of the spatial extent of the location reference, for example. The travel route of a user of the end user mapping device 200 may coincide with the location reference path(s) wholly or partly, or not at all. However, if wholly or partly, then the end user mapping device 200 can then compute a new travel route, derived at least in part by taking into account the at least one path of the transmitted at least one location reference enhanced by the at least one focusing factor. For example, the new travel route may be computed at the end user mapping device 200, at least in part, by information obtained by the reference location that describes where to place traffic jam delays, for example, which can be, in turn, reconstructed, at least in part, by using the at least one location reference enhanced by the at least one focusing factor.

In another embodiment, a mapping company can encode a LR and transmit it to another mapping company (server to server for example), for the purpose of conveying, for example, an update of map attributes for the that linear location of the location reference. In yet another embodi-ment, an end user may encode a location reference to channel to "friends" or other end users, a scenic linear location. In yet another embodiment, an end user may encode an LR to report a map error to the map provider server. In yet another embodiment, the LR can be encoded to report processed or raw probe data by mobile devices for compact communication. In yet another embodiment, an end user may encode an LR to report a stretch of road, for example, the location reference may be a reference to a traffic jam, which may be one a stretch of a highway, or may be a more complex set of road segments that describe, for example, a path from a baseball stadium to a freeway entrance (just after a game ends, for example). Thus, it should be understood that the use of traffic jams as LRs is merely one of many example embodiments of an LR, and how it can be transmitted to and used at an end user mapping device 200. As such, the present application should not be considered to be limited to LRs involving traffic jams, road closures, etc.

In an embodiment of the present application, the at least one location reference enhanced by the at least one focusing factor is usable by the at least one remote device in recon-structing the at least one path of the at least one location reference. Reconstructing a path (at least one path of a location reference) means computing it on the remote end user mapping device 200, using locally stored map data. By employing focusing factor(s) computed for LRs on the server 302 for each of its paths, for example, and enhancing LRs based upon focusing factors, the search area for path reconstruction can, for many paths, be reduced and can eliminate processing of nodes outside of that search area at the end user mapping device 200. Thus, in at least one embodiment of the present application, the at least one location reference enhanced by the at least one focusing factor is not only useable by the at least one remote device in determining a search area in reconstruction of the at least one path of at least one the location reference, the at least one location reference enhanced by the at least one focusing factor is also useable in determining a reduced search area in reconstruction of the at least one path of the at least one location reference. This is illustrated by comparing FIG. 5 to FIG. 6 or FIG. 7.

Figure 4:
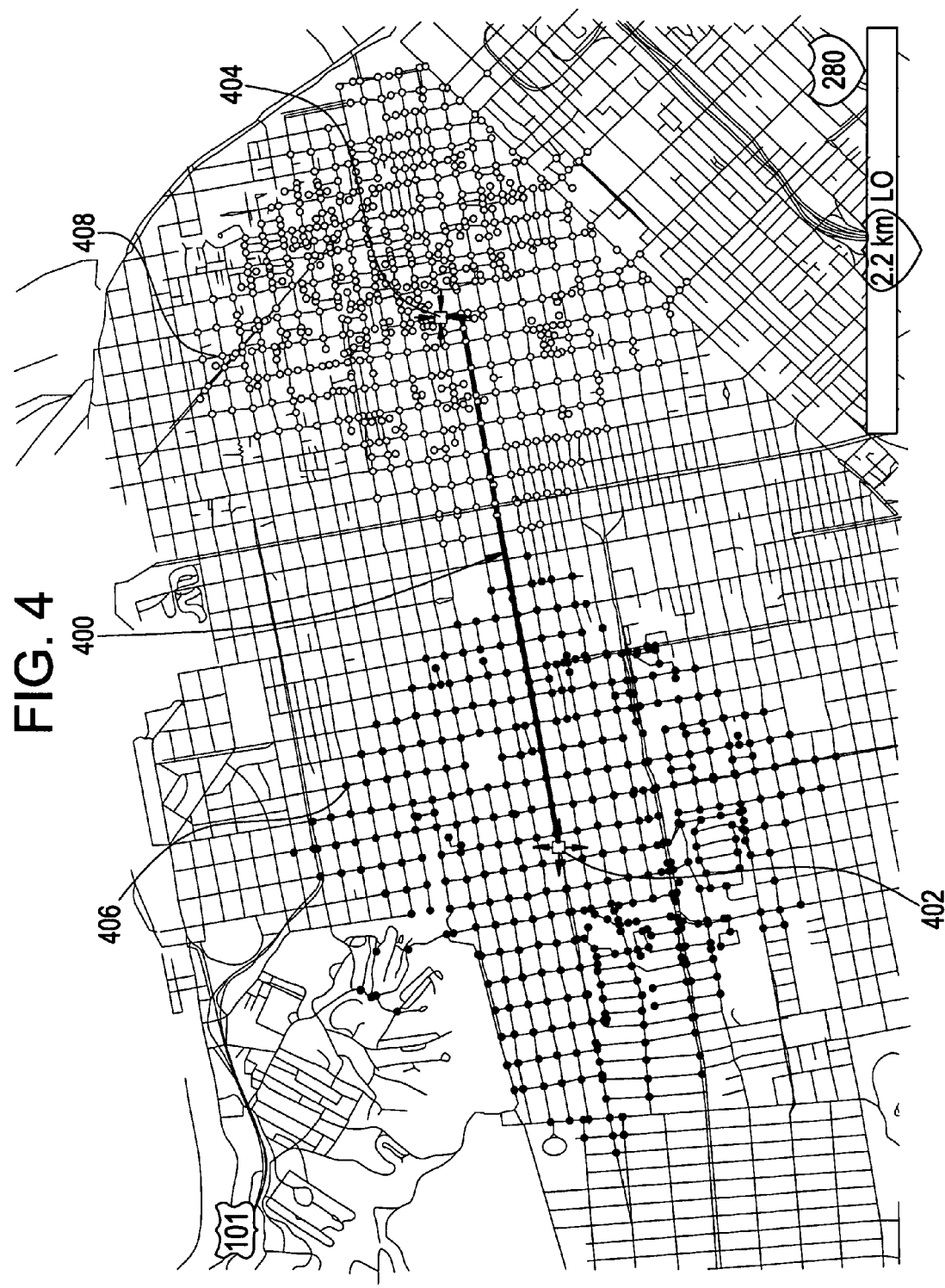
FIG. 4 illustrates an example embodiment of mapping information and navigation nodes explored during the path computation step of the location reference encoding process employed on a server device, or a linear reference path reconstruction or decoding step on a navigation device, without a focusing factor (heuristic value zero), when using a commonly employed shortest path algorithm by Dijkstra.

FIG. 4 illustrates an example embodiment of mapping information and navigation nodes explored during the loca-tion reference path computation step of the encoding process employed on a server 302, or a linear reference path recon-struction or decoding step on a remote device (end user mapping device 200, another server, etc.), without a focus-ing factor (heuristic value zero), when using commonly employed shortest path algorithm by Dijkstra. FIG. 4 shows an example map for a road network in San Francisco, Calif. This map is merely an example of a road network map, and should not be considered to be limited thereto in any way.

With regard to an example location reference path 400, an origin location is identified by element 402. A destination element is identified by element 404. The picture illustrates path search area during bi-directional search, with a heuristic focusing factor value of zero (no heuristic applied and thus of the search). Each of the points including solid circles 404 and open circles 408 represent nodes on a search graph, wherein those on a periphery of the path 400 are called the wave-front. Each node stores its cost of travel from the center of the wave 400. The least cost node on the wave front will then be the one to be propagated during route determi-nation.

Heuristic values may be used to adjust node costs so as to favor nodes closest to the destination during exploration. FIG. 4 illustrates a case when heuristic value is not used; wherein a path search area around routing points resembles a circle (a sphere on a graph).

Figure 5:
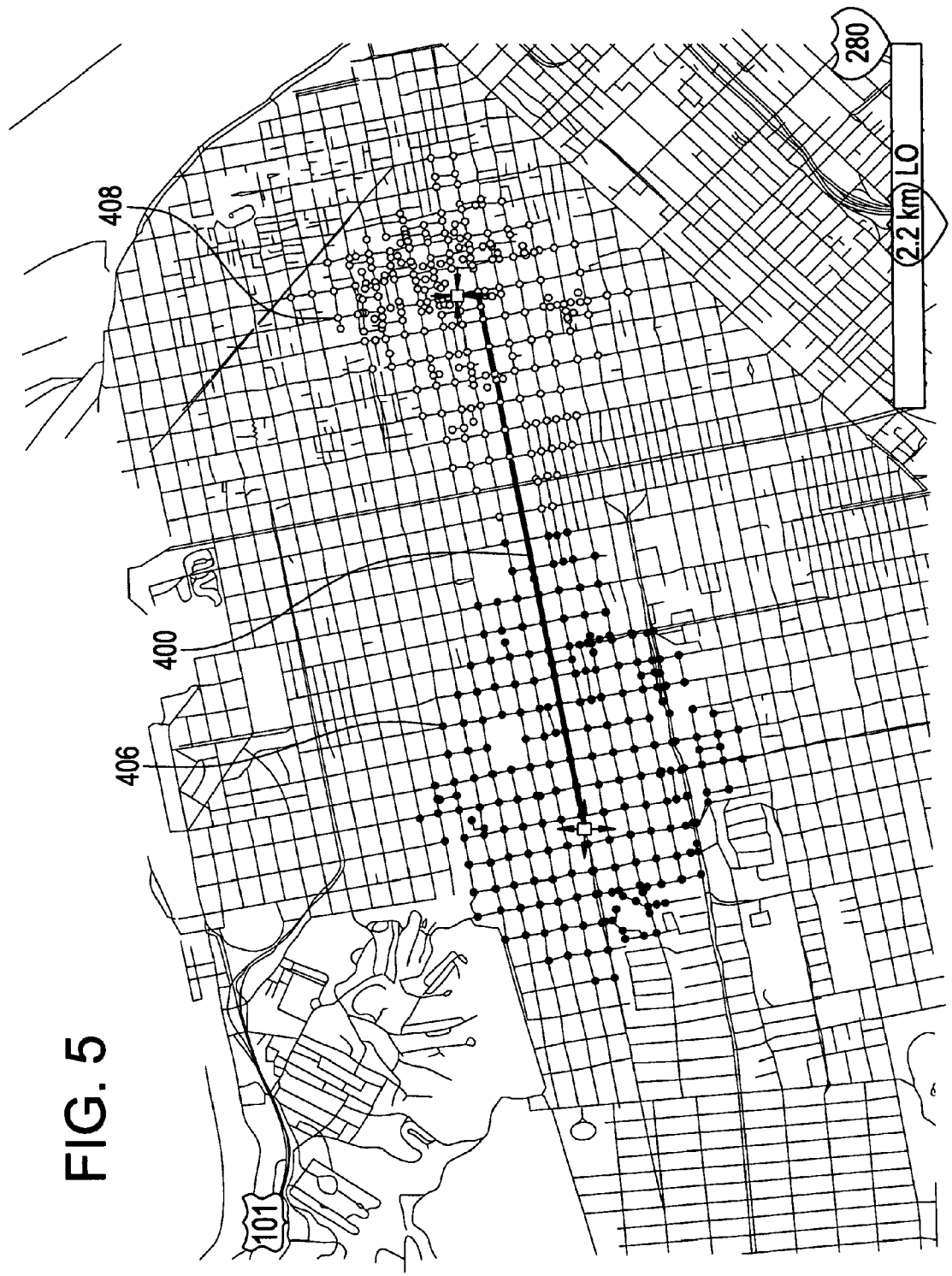
FIG. 5 illustrates an example embodiment of mapping information and navigation nodes explored during the location reference path computation step of the encoding process on the server device, or a location reference path reconstruction or decoding step on an end user mapping device, upon receipt of a focusing factor with heuristic value of 1 (a theoretical maximum for admissible heuristic value that guarantees an optimal path when using A* algorithm)

FIG. 5 illustrates the effect of the heuristic value 1 (a theoretical maximum that still guarantees a "shortest" path); here, the path search area narrows. Usually routing systems find a reasonable heuristic value between 0 and 1 through careful empirical tuning, and it remains constant for a given approach in shortest path computations. Following that tradition, LR encoding and decoding typically use the same architecture-wide heuristics. In an embodiment of the pres-ent invention, encoding uses a static admissible heuristic value, necessary to ensure that the shortest path will be found according to the cost criteria, while decoding uses a transmitted dynamic focusing factor (derived from the prop-erties of the path computed during encoding), to reduce path reconstruction search area (and hence the number of nodes to be processed and decoding computing time) to the learned spatial extent of the actual path to be reconstructed.

FIG. 5 illustrates an example embodiment of mapping information and navigation nodes explored during the location reference path computation step of the encoding process on the server device, or a location reference path reconstruction or decoding step on a remote device, upon receipt of a focusing factor with heuristic value of 1 (a theoretical maximum for admissible heuristic value that guarantees an optimal path when using A* algorithm). FIG. 5 illustrates the same path computation as FIG. 4, except with a heuristics focusing factor of one instead of zero (namely a theoretical maximum focusing factor that guarantees an optimal path). This means that each node cost on the wave-front is summed up with its estimated cost to the center of an opposite wave, an estimate being counted at 100% of the cost. As can be seen in FIG. 5, by utilizing an optimal focusing factor of 1 at the end user mapping device 200 or other remote device, the number of nodes 406 and nodes 408 in the search area is greatly reduced from that of FIG. 4 (which includes no focusing factor), which will thus translate into a faster reconstruction of the corresponding location reference on a decoding device, such as end user mapping device 200

Figure 6:
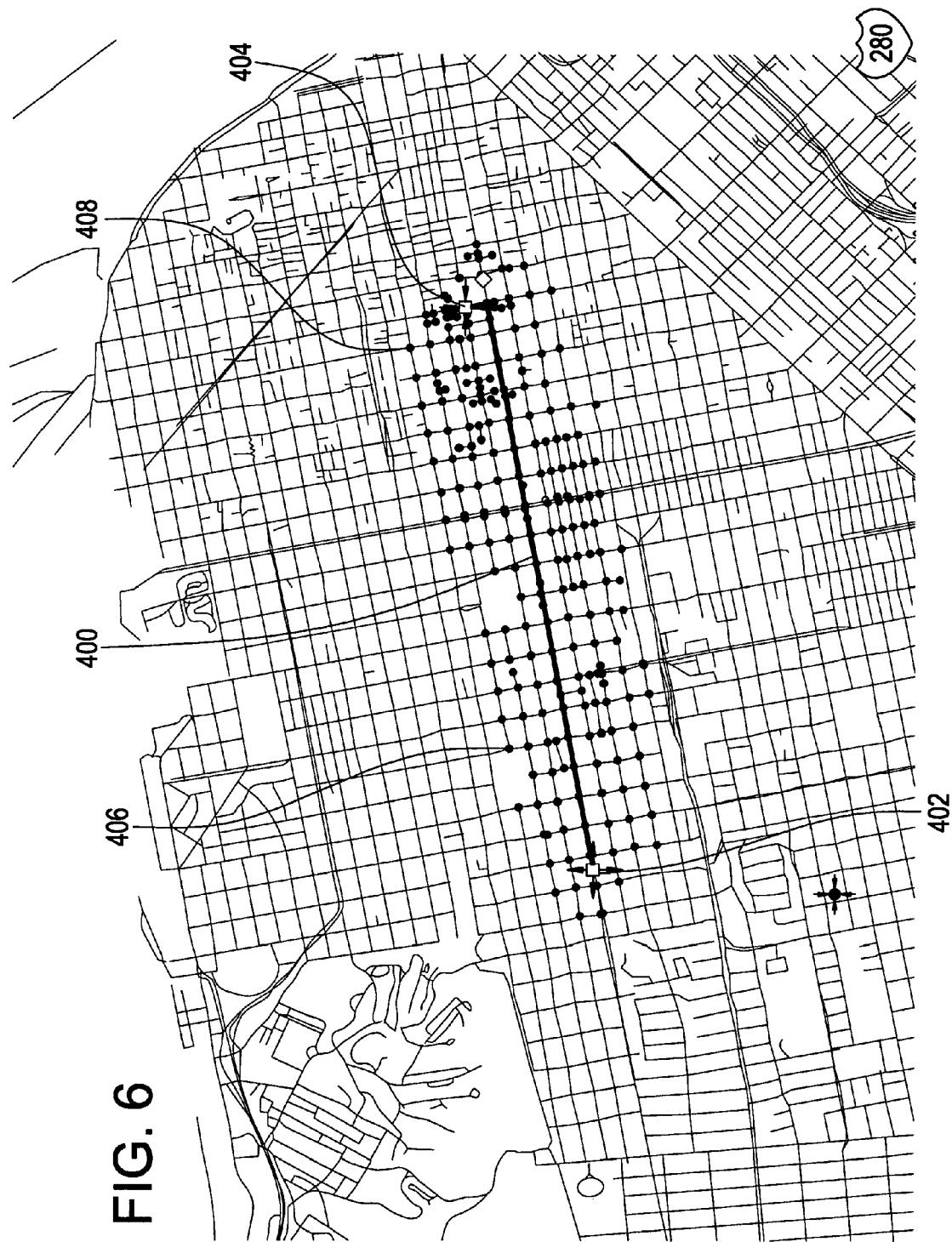
FIG. 6 illustrates an example embodiment of mapping information and navigation nodes, explored during the linear reference path reconstruction or decoding step on an end user mapping device, upon receipt of an example focusing factor.

FIG. 6 illustrates an example embodiment of mapping information and navigation nodes, explored during the linear reference path reconstruction or decoding step on a remote device, upon receipt of an example heuristic value (as a focusing factor of the enhanced location reference). FIG. 6 illustrates a first example of how the knowledge of characteristics of an already computed path, which is an encoded path known at server 302 for example, can be used to improve the speed of location reference path reconstruction at the remote device, such as end user mapping device 200. In this path computation, the heuristic value is 2, namely twice the theoretical maximum. It is possible to use such a strong heuristics without risking failure in reconstructing a shortest path in the navigation device 200, only because path characteristics between a starting node 402 and an ending node 404 are already known at the server 302 based upon the encoding path computation. As can be seen in FIG. 6, by further increasing the heuristic value, the number of nodes 406 and 408 within the search area will be further greatly reduced at the end user mapping device 200, even when compared to that of FIG. 5 for example.

Figure 7:
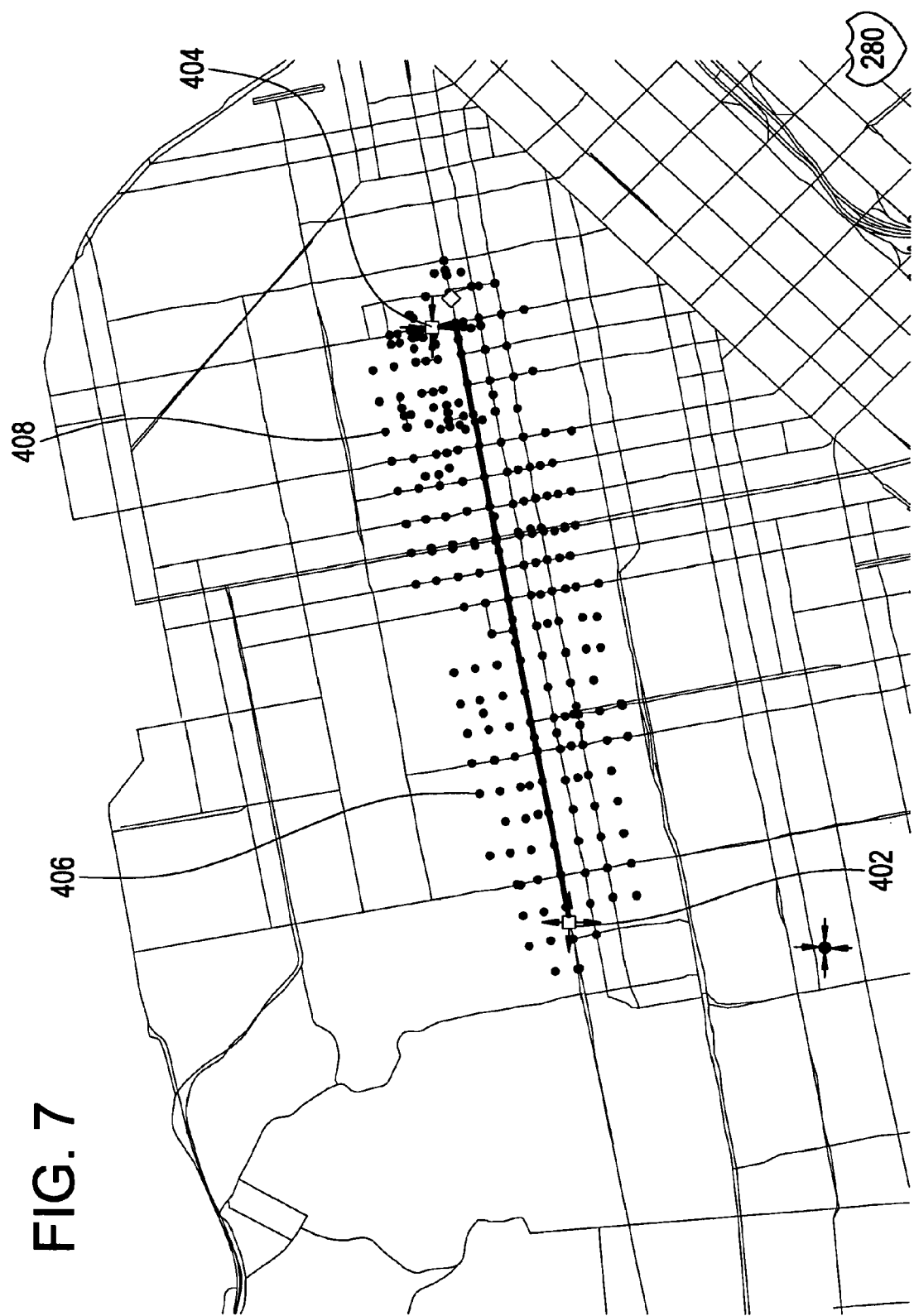
FIG. 7 illustrates the same example as FIG. 6, conveying less detailed street data for better visibility of the reduced search area.

FIG. 7 illustrates the same example as FIG. 6, conveying less detailed street data for better visibility of the reduced search area. This more clearly conveys the facts that when using a focusing factor computed based upon known locations between nodes at server 302, a very limited search area for node reconstruction will be conveyed to the end user mapping device 200 or other remote device via the calculated focusing factor, for subsequent route determination, including re-routing determination. Again, the number of nodes 406 and 408 is greatly reduced from that of FIG. 4, or even FIG. 5 for example.

FIGS. 6 and 7 show path search area greatly reduced to a shape resembling an ellipse on the planar graph, when using a heuristic value of 1.5. This dependency can be expressed as A=F(h), where A is a search area, and (h) is a the heuristic value that depends on the maximum path extent deviation, or maximum distance of the computed path nodes to the straight line between its routing points. Thus, in at least one embodiment of the present application, the at least one focusing factor includes at least one heuristic value, computed as a function of path node deviation, based upon the encoded information. The function is preferably reversely monotonic: the larger the extent of the path about the airline distance, the smaller the heuristic value. Thus, as the path node deviation is relatively increased, the at least one heuristic value is relatively decreased and as the path node deviation is relatively decreased, the at least one heuristic value is relatively increased. Path deviation could be computed during the backtracing step of the original path computation. Precise shape of a heuristic function could be determined empirically after experimenting with data, using dense maps of different cities where a decrease in the search area can significantly speed up computation. The function then will be a look-up from the table. For compression reasons, a stair-wise function could be used, where the domain of the function is divided into ranges, and the heuristics has the same value for each path extent value inside its range. Each range has a different heuristic value that would also be reversely monotonic to deviation values of the range. The value can be very compact, depending on specific requirements.

Figure 8:
FIG. 8 illustrates an example embodiment of mapping information and navigation nodes that may have been explored by other methods during the location reference path reconstruction or decoding step on an end user mapping device, but are filtered out by a method of an example embodiment of the present application when they fall outside the node deviation boundaries.

FIG. 8 illustrates an example embodiment of mapping information and navigation nodes that may have been explored by other methods during the location reference path reconstruction or decoding step on an end user mapping device, but are filtered out by a method of an example embodiment of the present application when they fall outside the node deviation boundaries. In this example embodiment, use is made of properties of a pre-computed path between nodes to optimize path reconstruction. A portion of the path after left turns towards the destination is a maximum deviation from path nodes to a straight line segment between an origin 402 and a destination 404, drawn as a dashed line 410 surrounding the nodes 402 and 404. The dashed line 410 along with the lateral extent form a bounding rectangle that limits the search area based on maximum deviation. Nodes in the search wave front, which fall outside the box, are eliminated from search. by the remote device, such as navigation device 200, during route determination, increasing compute speed.

Figure 9:
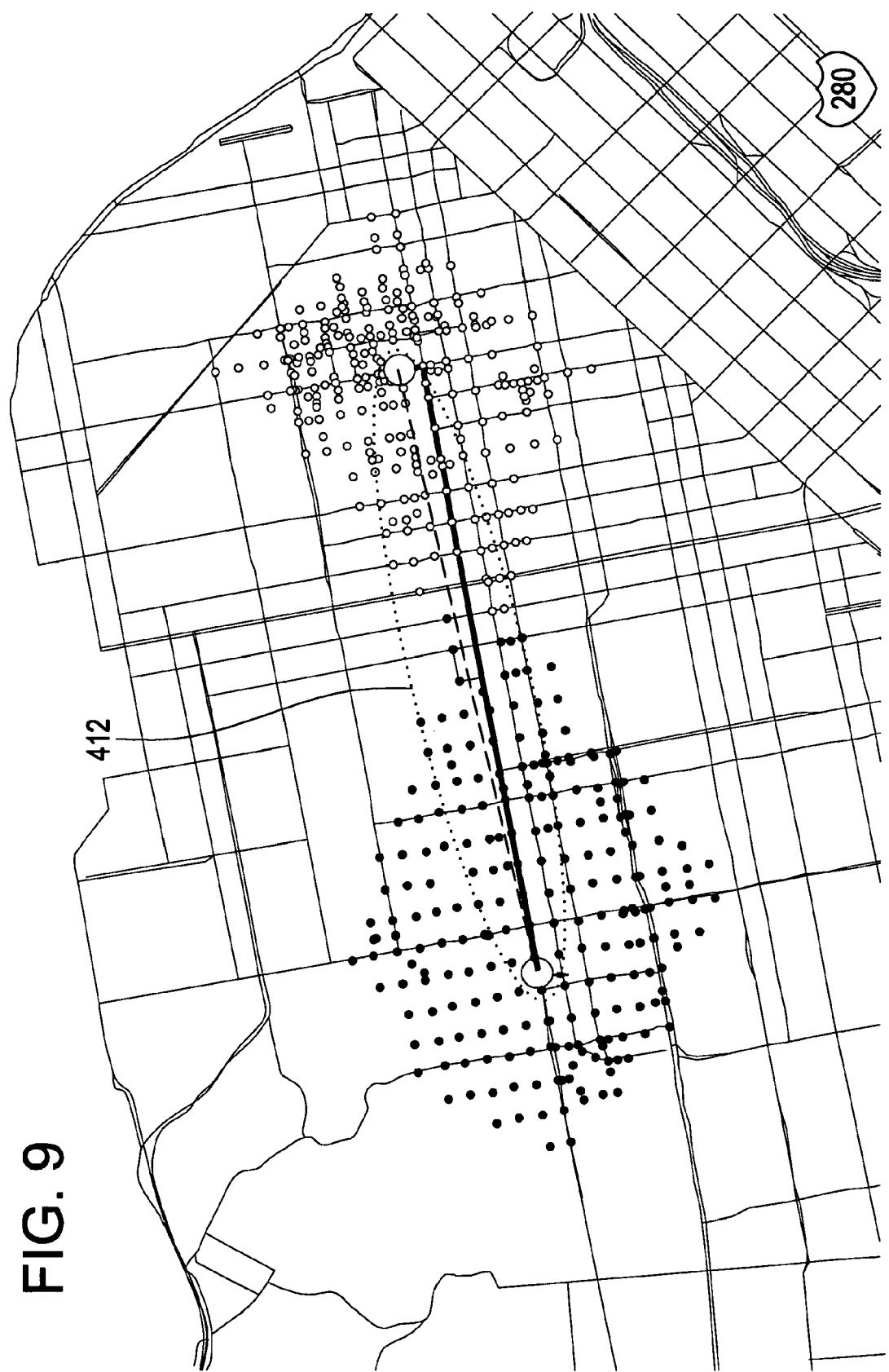
FIG. 9 illustrates an example embodiment of mapping information and potential navigation nodes, that may have been explored by other methods during the location reference path reconstruction or decoding step on an end user mapping device, but are filtered out by a method of an example embodiment of the present application when they fall outside the ellipse determined by the location reference path distance and routing points as the ellipse's foci.

FIG. 9 illustrates an example embodiment of mapping information and potential navigation nodes, that may have been explored by other methods during the location reference path reconstruction or decoding step on an end user mapping device, but are filtered out by a method of an example embodiment of the present application when they fall outside the ellipse determined by the location reference path distance and routing points as the ellipse's foci. In FIG. 9, known path distance at the server 302 and properties of an ellipse are known to minimize a search area 412, identified by the dashed lines forming an elliptical shape as shown in FIG. 9.

Similarly, other focusing factors or criteria described above will in many cases may yield a smaller search area (such as the area within the dotted rectangle on FIG. 8, or an ellipse on FIG. 9), and thus faster computing time at the end user mapping device 200. It should be stressed that focusing factors for example, can be used for the second computation of the same path of a location reference (when used to enhance the location reference and thus transmitted as part of the location reference), when actual path extent vs. a straight line is already determined during the original path computation and storage on the server 302. Thus, in at least one embodiment of the present application, the at least one location reference enhanced by the at least one focusing factor is useable by the at least one remote device in regulating node filtering in reconstruction of the at least one path of the at least one location reference.

Location reference is a rather unique field where the same path(s) of the location reference typically needs to be computed twice (first at the server 302 receiving or obtaining information regarding the location reference such as a location and/or the location reference itself, and then again at the end user mapping device 200 (remote device), which can receive and reconstruct the location reference path(s)). Path distance is another example of how a focusing factor may greatly limit the search area. When a computed path distance is sent to the end user mapping device 200, as a focusing factor portion of the enhanced location reference, to improve or even optimize path reconstruction, it can be used to filter out nodes that fall outside, for example, of the elliptical area enclosing the path being reconstructed, as shown on FIG. 9, whereby path routing points may be the ellipse foci and actual path distance defines the area of the ellipse for example. Any node and link that falls outside the area of the ellipse (preferably padded somewhat to compensate for possible coordinate accuracy threshold between different maps) is filtered out from processing at the end user mapping device 200. Thus, the at least one focusing factor may be expressed as path distance corresponding to the at least one path of the at least one location reference. Further, the focusing factor may be expressed as a relative measure of path distance vs. straight line distance between the path routing points, for example a percentage of path distance over the straight line.

Further, the received information may include at least one pair of points and a path distance over a distance between the at least one pair of points. Thus the distance, the path distance over a distance or any combination of these can be used as a focusing factor to filter out nodes in the path reconstruction at the remote device.

In an embodiment of the present application, a focusing factor can also be expressed as a path extent rectangle, derived from a maximum deviation of the computed path nodes from the straight line connecting its routing points along and across the path. Such a rectangle can be expressed as two offset values that behave similarly to the heuristic function and path ellipse discussed above, for the purpose of eliminating non-promising nodes from path reconstruction process at the end user mapping device 200. FIG. 8 illustrates a resulting search area and reduction on total processed nodes. Thus, by computing shortest paths of the location reference on the encoding server 302 and by enhancing location reference with a focusing factor(s) for each shortest path in the encoded reference location at the server 302 (which can then be transmitted from the server 302 to at least one remote device such as end user mapping device 200 for example), the decoding process (for the reconstruction of the at least one path of the location reference) at the at least one remote device (end user mapping device 200) will be improved by substantially reducing path computing in the reconstruction of the at least one path of the location reference on the at least one remote device (noting again that one or more location references and one or more computed focusing factors can be used to enhance the location reference transmitted and then received and used by the remote device in reconstructing the at least one path of the location reference, and noting again that such enhanced location reference(s) can be broadcast to and then used by a plurality of remote devices in reconstructing the at least one path of the location reference). FIG. 9 illustrates reduced search area and nodes that are outside, therefore eliminated from processing.

In an embodiment, the server 302 is transmitting a location reference (path(s)) that defines a linear location such as an event like a traffic jam, for example. Once the LR is decoded, focusing factors can be discarded. However, if a specific location referencing method used does not explicitly include an indication of an area to which the LR applies, and useful information can be obtained only by way of reconstructing the LR path(s), then path optimization factor(s) could be used prior to path reconstruction, for example, to check if a given LR is relevant to that end user device 200 (for instance, a traffic jam can be outside the route of travel, in which case the LR could be discarded without full decoding). Thus location facilitation parameters can be useful to eliminate unneeded at the at least one remote device.

In the method of an embodiment of the present application, functional road classes may be mapped into smaller sets of categories and thus negative effects of ambiguous FRC mapping between different encoding and decoding map data can be mitigated by the remote or end user mapping device 200 during the path reconstruction process. When path links are weighted by an FRC, the cost of traversal of a path link can be made cheaper or more expensive, depending on its FRC. Since path search is driven by node costs, a mismatch between a link FRC in encoding and decoding of maps is likely to produce a different "shortest" path. In at least one embodiment of the present application, FRCs could be mapped into a small number of categories, for example three, such as, for example: a category for top highway FRCs; one category for all ambiguous mid-tier range of FRCs; and a separate category for low-level residential and closed roads such as dead ends for example. In making route determination calculations at the encoding server 302 and in decoding at an end user mapping device 200, all FRCs in a particular category carry equal weight in path cost computations. These categories can be transmitted to the at least one remote device from the server 302 as part of the location facilitation parameters, for example.

In another embodiment, the set of FRCs may map into just one category, making the cost of traversal equal for all roads to thereby eliminate the need to rely on faulty FRC matching between an encoding server 302 and an end user mapping device 200. A resulting path search may be driven by more objective measures of the cost, namely, the true shortest distance computed at the server 302 from inherent properties of spatial data.

In at least one embodiment of the present application, a focusing factor can include heuristics to focus exploration toward the destination, which may further narrow the search and thus make path determination faster (as will be described further with regard to FIGS. 3-10 for example). To achieve that, node costs can be computed by utilizing information encoded at the server 302, in computing node cost at the end user mapping device 200 or other remote device. Thus, as the path node deviation is relatively increased, the at least one heuristic value is relatively decreased and as the path node deviation is relatively decreased, the at least one heuristic value is relatively increased.

In another embodiment, maximum deviation of path nodes and links from the straight line segment connecting two routing points can be computed on an encoding device within server 302 for example. Using deviation values, a rectangle could be drawn centered along this straight segment connecting two routing points, which would enclose both routing points and all nodes on the shortest path computed for example on the server 302. While reconstructing the shortest path between the two routing points on the decoding map, propagation by the processor 210 at the end user mapping device 200 could filter out nodes outside of this rectangle, slightly increased in size for possible variation of data accuracy between different map databases. In an embodiment of the present application, the encoding of information can use a static system-wide focusing factor and can compute a dynamic focusing factor for decoding that can vary depending on specifics of a location reference, which varies depending on specifics of the location reference. As with other focusing factor embodiments, a default value can be selected for the most common cases to optionally eliminate sending the focusing factor to the end user device 302 for all computed paths meeting the default criteria, while the method would reduce search area and filter out unpromising nodes according to the default value.

In one embodiment of the focusing factor a heuristic value which can be computed or calculated at the server 302 based upon encoded information corresponding to the determined location information, and which can be transmitted from the server 302 to at least one remote device, such as end user mapping device 200 for example, can be a function of maximum known deviation. The function may be largely monotonic, wherein the larger the deviation, the smaller the focusing factor. The precise shape of a function can be determined empirically after experimenting with data. For compression reasons, the method of an embodiment of the present application could use a stair-wise function, wherein the domain of this function may be divided into ranges, and the focusing factor may have the same value for each deviation value inside its range. Each range may have a different focusing factor value that is also reversely monotonic to deviation values of the range. Thus, the heuristic value can be very compact, depending on specific requirements.

Heuristics are used in algorithms to focus a search during route determination, toward a destination, which otherwise explores nodes indiscriminately in all directions. Path exploration for route determination is in the order of least cost node, on a node by node basis. Thus, costs must be determined and weighed, to select the next node in the route. To use heuristics computed at the server 302 as a focusing factors, node cost on the decoding device combines node cost the origin to the node on the wave front with a distance to the destination, multiplied by the heuristic value.

FIG. 4 illustrates an example embodiment of mapping information and navigation nodes explored during the location reference path computation step of the encoding process employed on a server (302), or a location reference path reconstruction or decoding step on a user end mapping device (200), without a focusing factor (a heuristic value of zero); and FIG. 5 illustrates an example embodiment of mapping information and navigation nodes explored during the location reference path computation step of the encoding process on the server (302), or a location reference path reconstruction or decoding step on an end user mapping device (200), upon receipt of a heuristic value of 1 (a theoretical maximum that guarantees an optimal path during the original path computation). Comparing FIGS. 4 and 5, one can see how the search area denoted by the number of node locations (round dots 406 and 408) gets smaller in FIG. 5. Routers typically choose admissible heuristic values between 0 and 1, with an appropriate effect on the search area.

In another embodiment, as the path distance between pairs routing points is known at the server 302, this information can be sent to a remote device (such as navigation device 200) to aid in decoding information of or otherwise reconstructing a location from a location reference. With two routing points that can serve as an ellipse's foci, and path distance indication, a resulting ellipse limits the area the computed path, which can be used to regulate node filtering at the remote device, such as an end user mapping device 200, which may be a navigation device for example.

A path is computed on the server 302; wherein the encoding includes a computed path distance indication for each pair of consecutive routing points (RPs), and that is sufficient to focus the path reconstruction search within reduced area. FIG. 5 shows an origin 402 and the destination 404 of the path or path segment of the location reference to be reconstructed, which are also the focuses of the ellipse as explained regarding FIG. 9. The cost is the improved or even optimized for travel distance.

When locations are initially encoded at the server 320, path search algorithms are utilized to determine where to insert routing points within the location being encoded, such that wherein the shortest path between two nodes deviates from the defined location, a routing point(s) is added between two existing nodes to ensure that the shortest path(s) between consecutive routing points cover the entire location. As path distances of a LR are known between routing points, this information or related information such as a percentage over this distance can be added as a focusing factor(s) at the server 302 for the path(s) of the location reference, which focusing factor(s) can then be used to enhance the location reference for transmission or broadcast to at least one and even multiple remote devices, such as navigation or other end user mapping devices 200, other servers, etc. As such, enhanced location reference(s) can be sent, enhanced by a computed focusing factor, to allow the remote device such as end user mapping device 200 to improve speed in decoding the traffic information. To obtain benefit of embodiments of the present application, focusing factors, such as dynamic computed focusing factors for example, should be added to information pertaining to each path of the location reference, to thereby enhance the location reference by the computed focusing factor for subsequent transmission to the remote device(s).

Faster decoding facilitates more effective processing of LR at the decoding devices, which would often time-out and drop LR messages in the past. With faster decoding of enhanced location references, such as traffic information for example, there is a lesser chance for a dropped messaged; and thus the device 200 can obtain a route which avoids the determined location reference, e.g. location of the traffic jam, road closure, etc. in an efficient manner. The remote device such as end user mapping device 200 can receive information which allows it to reconstruct the at least one path of the location reference by calculating the path faster in an reduced area and then calculate a route of travel which avoids the determined location of the at least one traffic jam, road closure, etc.

Accordingly, as shown in various aspects of FIGS. 4 to 9, by additionally encoding into the LR dynamic focusing factor(s), such as heuristic, path distance, or path extent deviation, at the server 302, for each corresponding shortest path of the location reference, a reduced path search area at the remote device, such as navigation device 200, can be used for fast and efficient reconstruction of the shortest path(s) for the purpose of decoding the location reference.

Dynamic focusing factors at the server 302, used to limit path search areas, regulate node filtering are shown in FIGS. 4 to 9. Thus, encoding of information at the server 302 can take place using a system-wide static focusing factor while decoding at the remote device such as navigation device 200, can utilize a dynamic focusing factor(s), derived at server 302, that vary depending on specifics of the shortest path(s) of the location reference determined within the mapping information at the server 302.

A decoding focusing factor in a form of distance indication computed at the server 302, is based upon encoded information corresponding to the determined at least one path of the location reference. Such a focusing factor can be reversely monotonic The closer is path distance to the straight line segment connecting two routing points, the narrower the elliptical search area and the faster the search for path reconstruction as shown by element 412 of FIG. 9 for example, owing to the ellipse's property of linear eccentricity.

Thus, by the server 302 making use of the known distance of a path between origin and destination node 402 and 404 calculated during encoding, the path search area becomes elliptical as shown in FIG. 9 for example on the decoding side, with focuses on two routing points. When the two distances are nearly equal, the reconstructed path follows a straight line between the two routing points. In at least one embodiment of the present application, the focusing factor may not be the path distance itself, but a relative measure of path distance vs. straight line distance between the foci, for example a percentage of path distance over the straight line.

The methods of the embodiments of the present application result in sharply curtailing the exploration or search area, and thus the decoding compute time, for the majority of paths on the remote device during decoding, when compared with traditional factors.

In at least one embodiment, the inventor has determined that many traffic-related segments of locations between two routing points fall into a range near a straight line. To keep the encoding size small, there could be a default dynamic decoding focusing factor in one embodiment of the present application, determined from experimental data to be the most common dynamic focusing factor useful to reduce search area in reconstruction of many paths, for example. This is aimed at keeping the size of encoded locations small, satisfying a critical requirement in location referencing. In at least one such example embodiment, an optional focusing factor parameter may be added to indicate a wider search area, necessary to reconstruct a path, as determined by one of the methods described above. This optional parameter may be tailored to ensure a search area that is just sufficient to find a matching path, but different from one determined by the default dynamic focusing factor. Thus, in one embodiment, a default dynamic focusing factor may be set, wherein the at least one location reference is enhanced by an indication of a default dynamic focusing factor to be used in path reconstruction. Conversely, in at least one an embodiment, at least one optional dynamic focusing factor pertaining to at least one path can be added to the LR before transmission, only upon the at least one focusing factor being different from the default dynamic value.

In at least one embodiment, the focusing factor includes an indication of maximum allowed path length, the two routing points and path length indication convey the area of an ellipse which contains all nodes and links that can be potentially useful for reconstructing the original shortest path. When path search iterates propagating from a least cost node, any new node with its links that fall outside the elliptical area are eliminated from consideration, by comparing the sum of an already computed cost to reach the node, and a straight line cost to reach the destination, against the indicated maximum allowed path length. As with other focusing factor techniques, a default value can be selected to express the most common value of the facilitating focusing factor. For instance, a maximum path length of up to 10% over a straight line distance can be chosen as a default parameter; then optionally a maximum allowed distance indication can be omitted from the location facilitation parameter for any encoded path that meets this criteria, and the method would by default limit the search area according to the default value. Thus, in at least one embodiment, a default focusing factor may be set, wherein the at least one location reference is enhanced by at least one indication of a default focusing factor for at least one path before transmission, and wherein the reconstructing includes using the at least one location reference enhanced by the default focusing factor for at least one path. The default may not be sent or may be encoded to reduce transmitted packet size.

Further, the received at least one location reference enhanced by at least one focusing factor may include a path distance of the at least one path of the at least one location reference, and the received path distance may then be used in regulating node filtering, in reconstruction of the at least one path of the location reference.

Thus, by any of the embodiments of the methods expressed above, in at least one embodiment the computed at least one location reference enhanced by at least one focusing factor can be received and is then useable at the remote device (such as an end user mapping device 200 and/or navigation device) to reconstruct the at least one path of the location reference, wherein a travel route is determined at the device to avoid, to an extent possible consistent with routing criteria, the reconstructed at least one path of the at least one location reference. This at least one location reference for at least one embodiment may be that of, for example, at least one traffic jam or the like. Alternatively new route calculations can occur at the server 302 and the remote device can receive a new travel route, which itself may be determined to avoid a location reference enhanced by at least one focusing factor. In embodiments this new route may be deviated from an original route to avoid, to an extent possible consistent with routing criteria, the at least one path of the at least one location reference enhanced by a focusing factor and representing, for example, at least one traffic jam.

The methods of the embodiment expressed above may be implemented by a system, including a server 302 for example, and/or on a remote device, such as a end user mapping device 200, another server, etc. Thus at least one embodiment of the present application is directed to a system comprising a receiver 310 to at least one of obtain and receive information regarding at least one location reference at a server 302 for transmission to at least one remote device; a processor (304) to determine at least one path of the at least one location reference corresponding to at least a pair of points within mapping information at the server (302) and to compute at least one focusing factor at the server (302) based upon encoded information corresponding to the determined at least one path of the at least one location reference; and a transmitter (308) to transmit the at least one location reference enhanced by the at least one focusing factor from the server (302) to the at least one remote device. The at least one remote device may be an end user mapping device such as, for example, a navigation device (and the navigation device may a portable navigation device, an in-vehicle navigation device, etc.); and/or may be another server. Further, the at least one remote device may include a plurality of remote devices, wherein the transmitter of the server 302 is further useable to broadcast to the plurality of remote devices.

Figure 10:
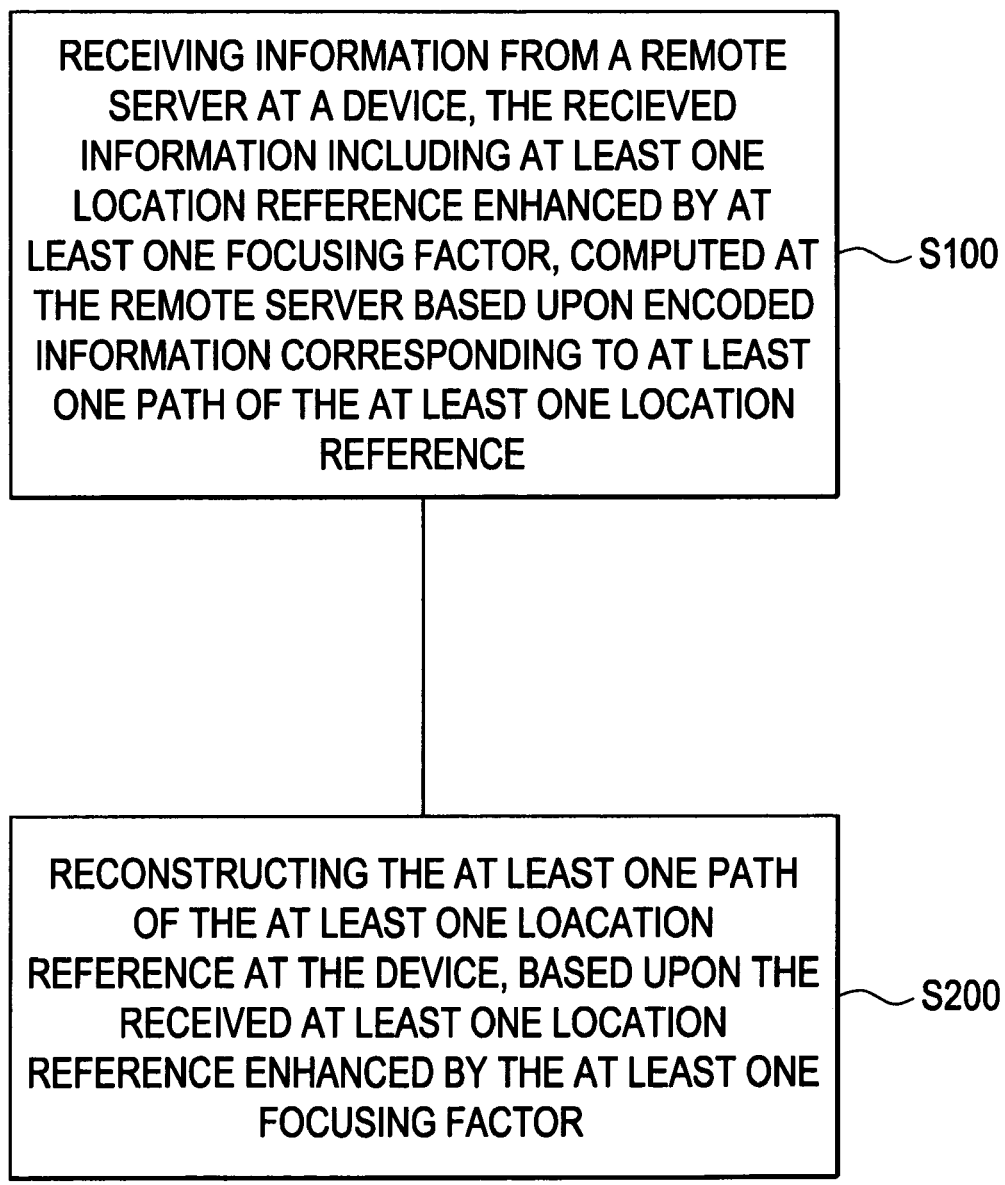
FIG. 10 illustrates an example embodiment of a method of the present application.

FIG. 10 is directed to an example embodiment of a method of the present application performed at the remote device, such as a end user mapping device 200 or server for example. The method includes S100 receiving information from a remote server (302), at a device (200), the received information including at least one location reference enhanced by at least one focusing factor, computed at the remote server (302) based upon encoded information corresponding to at least one path of the at least one location reference; and S200 reconstructing the at least one path of the at least one location reference at the device (200), based upon the received at least one location reference enhanced by the at least one focusing factor. Again, the device may be an end user mapping device such as, for example, a navigation, or it may be another server. Also, the device may be one of a plurality of remote devices, and wherein the received information includes information broadcast to the plurality of remote devices.

Accordingly, in at least one example embodiment, the remote device may receive the enhanced at least one location reference computed at the remote server 302 and may use it to reconstruct the at least one location reference in a manner similar to that previously described above and with regard to FIGS. 4 to 10 for example. In at least one embodiment, the reconstructing may include using the received information in determining a search area in reconstruction of the at least one path of the at least one location reference, using the received information in determining a reduced search area in reconstruction of the at least one path of the at least one location reference; and/or using the received at least one location reference enhanced by the at least one focusing factor in regulating node filtering in reconstruction of the at least one path of the at least one location reference.

Further, in at least one example embodiment, the at least one focusing factor may include at least one heuristic value, computed as a function of path node deviation, based upon the encoded information, wherein as the path node deviation is relatively increased, the at least one heuristic value is relatively decreased and as the path node deviation is relatively decreased, the at least one heuristic value is relatively increased. Further, the at least one focusing factor may be computed based upon at least one pair of encoded points and a path distance over a distance between a pair of points corresponding to the at least one path of the at least one location reference.

Further, in at least one example embodiment, the received information may include at least one pair of points and one of a distance and a path distance over a distance between the at least one pair of points and a combination thereof. Thus the distance, the path distance over a distance or any combination of these can be used as a focusing factor to filter out nodes in the path reconstruction at the remote device.

Further, in at least one example embodiment, the computed at least one location reference enhanced by at least one focusing factor may be used to reconstruct the at least one path of the location reference, wherein a travel route is determined at the device to avoid, to an extent possible consistent with routing criteria, the reconstructed at least one path of the at least one location reference. Alternatively, a new travel route may be received at the device, reflective of the received at least one computed at least one location reference enhanced by at least one focusing factor, deviated from an original route to avoid, to an extent possible consistent with routing criteria, the at least one path of the at least one location reference.

Further, in at least one example embodiment, the received at least one location reference enhanced by at least one focusing factor may include a path distance, and the received path distance may then be used to determine path search area, used to determine path search area, and hence used in regulating node filtering in reconstruction of the at least one path of the location reference. Also, in at least one embodiment, a default dynamic focusing factor may be set and wherein the at least one location reference is enhanced by at least one indication of a default focusing factor for at least one path before transmission, wherein the reconstructing includes using the at least one location reference enhanced by the default dynamic focusing factor for at least one path. Further, the default may not be sent or may be encoded to reduce transmission packet size.

The methods of the embodiment expressed above may be implemented by a device, including but not limited to an end user mapping device 200 such as a navigation device for example, another server, etc. Thus at least one embodiment of the present application is directed to a device including a receiver (250, 322) to receive information from a remotely located server (302), the information including at least one location reference enhanced by at least one focusing factor computed at the server (302) based upon encoded information corresponding to at least one path of the at least one location reference; and a processor (210) to reconstruct the at least one path of the at least one location reference at the device (200), based upon the computed at least one location reference enhanced by at least one focusing factor. The device is an end user mapping device (200), and the end user mapping device (200) may be a navigation device. The navigation device may a portable navigation device, an in-vehicle navigation device, etc.

In at least one embodiment, the spatial content information (e.g. map data) includes traffic related information, such as that of a traffic jam, road closure, etc. The method of at least one embodiment may include establishing a connection with the server, the information being received from the server upon establishing a connection. The connection may be a wireless connection, for example between the server 302 and a remote device such as navigation device 200.

In at least one embodiment, routing information such as that of a detour for example, around the determined location reference, may also be conveyed and transmitted to the remote device(s), wherein the at least one remote device may compute a travel route, derived at least in part, by taking into account the transmitted enhanced location reference, for example transmitted in packets to the remote devices, such as navigation or other end user mapping devices 200, other servers, etc. Received information may be stored a memory (230).

In at least one other embodiment, the receiver (250, 322) may be configured to receive a new travel route, deviated from an original route to avoid, to an extent possible consistent with routing criteria, the at least one path of the at least one location reference.

In the text above, location references are mentioned throughout embodiments of the present application. Uses, throughout any of the above expressed embodiments of the present application, for these location references can include, but are not limited to, traffic usage: traffic jams, detours, etc.—servers transmitting to end user devices or other servers, clients (remote devices) reporting traffic, etc.;

safety applications—clients (remote devices) reporting an accident location;

reporting of processed or raw probe data by mobile devices (remote devices);

tourist routes;

friend finder applications, sharing location information;

fleet operators sending route descriptions to the fleet vehicles;

incremental updates of map data;

sharing of auxiliary data pertaining to linear locations;

etc.

Device application software access and manipulate the derived digital map application database in response to user inputs. The software's output to the user can be in a list, text, graphical display such as a map or video, audio such as speech, or other type of output. Many GIS, Internet and Navigation applications can use embodiments of the present invention discussed above. These applications include geocoding applications (text/list based), routing/directions applications (graphical/list/speech based) and graphical-based display applications. The applications can include navigation, Internet-based and Geographical Information Systems (GIS) among others. The application can be a mapping program, a navigation program or some other type of program. As discussed above, map application consumers have been provided with a variety of devices and systems to enable them to locate desired places. These devices and systems are in the form of in-vehicle navigation systems which enable a driver to navigate over streets and roads and to enter desired places, hand-held devices such as personal digital assistants ("PDAs") and cell phones that can do the same, and Internet applications in which users can access maps using or depicting the desired results. For purposes of this disclosure all such results are simply defined as "places."

Figure 11:
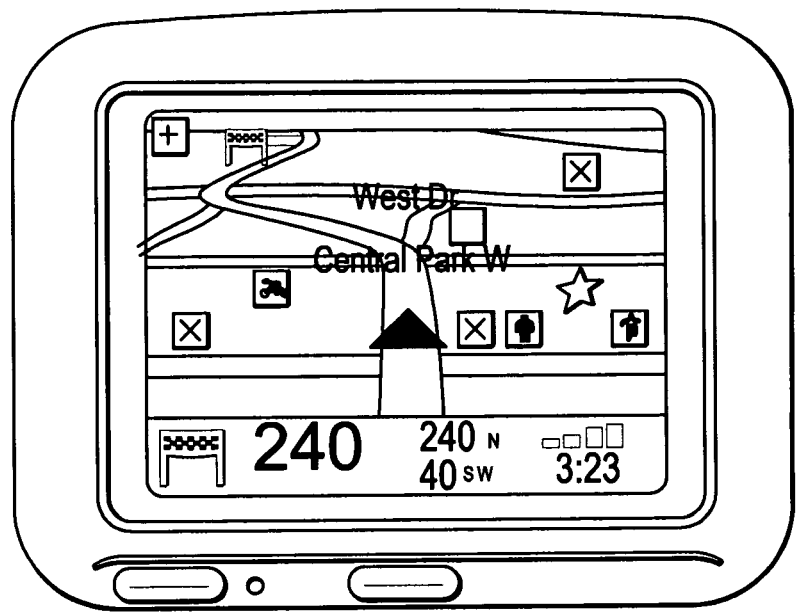
FIG. 11 illustrates an example hand-held device, such as personal navigation device (PND), where an embodiment can be realized.

FIG. 11 illustrates an example embodiment as used on a portable hand-held device, such as personal digital assistant (PDA). The device could also be a cell phone, for example. On PDA map software, an example search may be performed by a user who wants driving directions to 150 Central Park West. The PDA map software utilizes embodiments of the present invention to accurately display the location of 150 Central Park West using the PDA map software.

Figure 12:
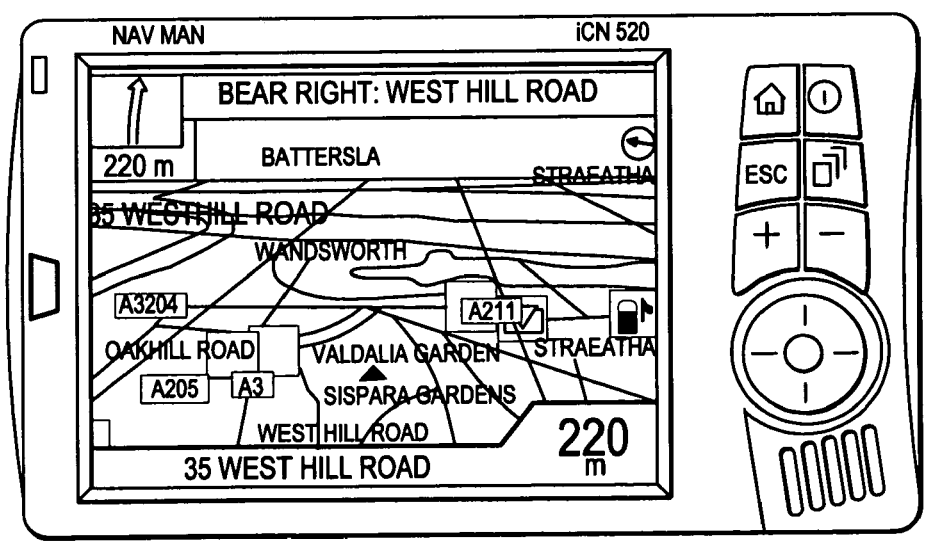
FIG. 12 illustrates an example in-vehicle navigation system, where an embodiment can be realized

FIG. 12 illustrates an example embodiment of the method, database, memory, etc. as used on an in-vehicle navigation system, such as a global positioning system (GPS). On GPS map software, an example search may be performed by a driver who wants driving directions to 35 West Hill Road, as shown at the bottom of the GPS map software. The GPS map software utilizes embodiments of the present invention to accurately display the location of 35 West Hill Road, once the driver reaches his or her destination using the GPS software.

The methods of the embodiment expressed above may be implemented by a system, including a server 302 for example, and/or on a device, such as an end user mapping device 200 for example. At least one embodiment of the present application is directed to a device comprising a receiver 322/250 to receive information from a remotely located server 302, the information including a location reference within map data and a focusing factor, computed at the server 302 based upon encoded information corresponding to the location; and a processor 210 to determine a route of travel based upon the received location reference within the spatial content information (e.g. map data) and the received focusing factor.

Even further, any of the aforementioned methods may be embodied in the form of a program. The program may be stored on a computer readable media and is adapted to perform any one of the aforementioned methods when run on a computer device (a device including a processor). Thus, the storage medium or computer readable medium, is adapted to store information and is adapted to interact with a data processing facility or computer device to perform the method of any of the above mentioned embodiments.

Appropriate software coding can readily be prepared by skilled programmers based on the teachings of the present disclosure, as will be apparent to those skilled in the software art. Embodiments of the invention may also be implemented by the preparation of application specific integrated circuits or by interconnecting an appropriate network of conventional component circuits, as will be readily apparent to those skilled in the art.

Embodiments of the present invention include a computer program product which is a storage medium (computer readable medium) having instructions stored thereon/in which can be used to program a computer to perform any of the methods described above of embodiments of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems, including molecular memory ICs, or any type of system or device suitable for storing instructions and/or data.

Embodiments of the present invention include a computer readable medium, including program segments for, when executed on a processor of the server 302 and/or of the navigation device 210, causing the server 302 or end user mapping device 200 to implement the methods of embodiments of the present application described above. Again, as would be understood by one of ordinary skill in the art, any of the techniques of embodiments of the methods of the present application described above, are equally applicable to the program segments of computer readable medium discussed herein.

Stored on any one of the computer readable medium (media), embodiments of the present invention include software (including, for example, program segments) for controlling both the hardware of the general purpose/specialized computer or microprocessor, and for enabling the computer or microprocessor to interact with a human user or other mechanism utilizing the results of embodiments of the present invention. Such software may include, but is not limited to, device drivers, operating systems, program segments and user applications. Ultimately, such computer readable media further includes software for performing embodiments of the present invention, as described above.

Included in the programming or software of the general/specialized computer or microprocessor are software modules for implementing the teachings of the embodiments of present invention. Embodiments of the present invention may be conveniently implemented using a conventional general purpose or a specialized digital computer or microprocessor programmed according to the teachings of the present disclosure, as will be apparent to those skilled in the computer art.

The foregoing description of the embodiments of the present invention has been provided for the purposes of illustration and description. It is not intended to be exhaustive or to limit embodiments of the invention to the precise forms disclosed. Many modifications and variations will be apparent to a practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

It will also be appreciated that whilst various aspects and embodiments of the present invention have heretofore been described, the scope of the present invention is not limited to the particular arrangements set out herein and instead extends to encompass all arrangements, and modifications and alterations thereto, which fall within the scope of the appended claims.

For example, whilst the above-described destination view includes images representative of buildings surrounding the destination address, it will be appreciated a destination view that included a rendered image of only the destination address would still help the user to identify and navigate to that address. Accordingly, whilst it is preferred to generate rendered images of the destination address and neighboring buildings, this is not an essential feature of the invention.

For example, whilst embodiments described in the foregoing detailed description refer to GPS, it should be noted that the navigation device may utilize any kind of position sensing technology as an alternative to (or indeed in addition to) GPS. For example the navigation device may utilize using other global navigation satellite systems such as the European Galileo system. Equally, it is not limited to satellite based but could readily function using ground based beacons or any other kind of system that enables the device to determine its geographic location.

It will also be well understood by persons of ordinary skill in the art that whilst the preferred embodiment implements certain functionality by means of software, that functionality could equally be implemented solely in hardware (for example by means of one or more ASICs (application specific integrated circuit)) or indeed by a mix of hardware and software. As such, the scope of the present invention should not be interpreted as being limited only to being implemented in software.

Lastly, it should also be noted that whilst the accompanying claims set out particular combinations of features described herein, the scope of the present invention is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A method, comprising:
   receiving information, by a device, from a remote server (302), the received information including at least one location reference enhanced by at least one focusing factor, the at least one focusing factor computed at the remote server (302) based upon encoded information corresponding to at least one path of the at least one location reference, and the at least one focusing factor comprising a search area suggestion from the remote server (302) for reconstructing the at least one path of the at least one location reference; and
   reconstructing, by the device, the at least one path of the at least one location reference at the device, based upon the received at least one location reference enhanced by the at least one focusing factor;
   wherein a default focusing factor is set and wherein the at least one location reference is enhanced by the at least one focusing factor before transmission, by the remote server, only upon the at least one focusing factor being different from the default focusing factor.

2. The method of claim 1, wherein the reconstructing includes using, by the device, the received information in determining a search area in reconstruction of the at least one path of the at least one location reference.

3. The method of claim 1, wherein the reconstructing includes using, by the device, the received information in determining a reduced search area in reconstruction of the at least one path of the at least one location reference.

4. The method of claim 2, wherein the reconstructing includes using, by the device, the received at least one location reference enhanced by the at least one focusing factor in regulating node filtering in reconstruction of the at least one path of the at least one location reference.

5. The method of claim 1, wherein the at least one focusing factor includes at least one heuristic value, computed, by the remote server, as a function of path node deviation, based upon the encoded information.

6. The method of claim 5, wherein as the path node deviation is relatively increased, the at least one heuristic value is relatively decreased and as the path node deviation is relatively decreased, the at least one heuristic value is relatively increased.

7. The method of claim 1, wherein the at least one focusing factor is computed, by the remote server, based upon at least one pair of encoded points and a path distance.

8. The method of claim 1, wherein the received information includes at least one pair of points and a path distance.

9. The method of claim 1, wherein the device is another server.

10. The method according to claim 1, further comprising:
    using, by the device, the computed at least one location reference enhanced by at least one focusing factor to reconstruct the at least one path of the location reference, wherein a travel route is determined at the device to avoid, to an extent possible consistent with routing criteria, the reconstructed at least one path of the at least one location reference.

11. The method according to claim 1, further comprising:
    receiving, by the device, a new travel route, deviated from an original route to avoid, to an extent possible consistent with routing criteria, the at least one path of the at least one location reference.

12. The method according to claim 1, wherein the received at least one location reference enhanced by at least one focusing factor includes a path distance, the method further comprising:
    using, by the device, the received path distance in regulating node filtering in location reconstruction of the at least one path of the location reference.

13. A non-transitory computer readable medium including program segments for, when executed on a processor, causing a device to implement a method, the method comprising:
    receiving information, by the device, from a remote server (302), the received information including at least one location reference enhanced by at least one focusing factor, the at least one focusing factor computed at the remote server (302) based upon encoded information corresponding to at least one path of the at least one location reference, and the at least one focusing factor comprising a search area suggestion from the remote server (320) for reconstructing the at least one path of the at least one location reference; and
    reconstructing, by the device, the at least one path of the at least one location reference at the device, based upon the received at least one location reference enhanced by the at least one focusing factor;

wherein a default focusing factor is set and wherein the at least one location reference is enhanced by the at least one focusing factor before transmission, by the remote server, only upon the at least one focusing factor being different from the default focusing factor.

14. A device (200), comprising:
a receiver (250, 322) to receive information from a remotely located server (302), the information including at least one location reference enhanced by at least one focusing factor, the at least one focusing factor computed at the server (302) based upon encoded information corresponding to at least one path of the at least one location reference, and the at least one focusing factor comprising a search area suggestion from the remote server (302) for reconstructing the at least one path of the at least one location reference; and
a processor (210) to reconstruct the at least one path of the at least one location reference at the device (200), based upon the computed at least one location reference enhanced by at least one focusing factor;
wherein a default focusing factor is set and wherein the at least one location reference is enhanced by the at least one focusing factor before transmission, only upon the at least one focusing factor being different from the default focusing factor.

15. The device (200) of claim 14, wherein the processor (210) is configured to use the received information in determining a search area in reconstruction of the path of the location reference.

16. The device (200) of claim 14, wherein the processor (210) is configured to use the received information in determining a reduced search area in reconstruction of the at least one path of the location reference.

17. The device (200) of claim 15, wherein the processor (210) is configured to use the received at least one location reference enhanced by at least one focusing factor in regulating node filtering in reconstruction of the at least one path of the at least one location reference.

18. The device (200) of claim 14, wherein the at least one focusing factor includes at least one heuristic value, computed as a function of path node deviation, based upon the encoded information.

19. The device (200) of claim 18, wherein as the path node deviation is relatively increased, the at least one heuristic value is relatively decreased and as the path node deviation is relatively decreased, the at least one heuristic value is relatively increased.

20. The device (200) of claim 14, wherein the at least one focusing factor is computed based upon at least one pair of encoded points and a path distance.

21. The device (200) of claim 14, wherein the received information includes at least one pair of points, and a path distance.

22. The device (200) of claim 14, wherein the device is another server.

23. The device (200) according to claim 14, wherein the processor (210) is configured to use the received at least one location reference enhanced by at least one focusing factor to reconstruct the at least one path of the location reference, wherein a travel route is determined at the device to avoid, to an extent possible consistent with routing criteria, the reconstructed at least one path of the at least one location reference.

24. The device (200) according to claim 14, wherein the receiver (250, 322) is configured to receive a new travel route, deviated from an original route to avoid, to an extent possible consistent with routing criteria, the at least one path of the at least one location reference.

25. The device (200) of claim 14, further comprising:
a wireless device (250) to establish a wireless connection with the server (302), the information being received from the server (302) upon establishing the connection.

26. The device (200) of claim 14, further comprising:
a memory (230) to store the received information.

* * * * *